US010233033B2

(12) United States Patent
Launiere

(10) Patent No.: US 10,233,033 B2
(45) Date of Patent: Mar. 19, 2019

(54) MULTIPLE AXIS WORK-PIECE TRANFSER APPARATUS

(71) Applicant: DIEBOTICS IP, LLC, Farmington Hills, MI (US)

(72) Inventor: Timothy Richard Launiere, Cedar Springs, MI (US)

(73) Assignee: DIEBOTICS IP, LLC, Farmington Hills, MI (US)

(*) Notice: Subject to any disclaimer, the term of this patent is extended or adjusted under 35 U.S.C. 154(b) by 528 days.

(21) Appl. No.: 14/554,562

(22) Filed: Nov. 26, 2014

(65) Prior Publication Data
US 2015/0147140 A1 May 28, 2015

Related U.S. Application Data

(60) Provisional application No. 61/909,759, filed on Nov. 27, 2013, provisional application No. 62/041,348, filed on Aug. 25, 2014.

(51) Int. Cl.
*B21D 43/05* (2006.01)
*B65G 47/46* (2006.01)
(Continued)

(52) U.S. Cl.
CPC ........... *B65G 47/46* (2013.01); *B21D 43/055* (2013.01); *B23Q 1/5468* (2013.01);
(Continued)

(58) Field of Classification Search
CPC .............................. B23Q 1/5468; B21D 43/055
See application file for complete search history.

(56) References Cited

U.S. PATENT DOCUMENTS 4,895,013 A * 1/1990 Sofy .................... B21D 43/055
198/621.1
4,921,395 A * 5/1990 Sahlin .................. B21D 43/105
414/744.3
(Continued)

FOREIGN PATENT DOCUMENTS

EP 0925873 A2 6/1999
EP 1365893 A1 8/2002
(Continued)

OTHER PUBLICATIONS

International Search Report and Written Opinion dated Sep. 2, 2015 for Application No. PCT/US2014/067654.
(Continued)

*Primary Examiner* — Ronald P Jarrett
(74) *Attorney, Agent, or Firm* — The Dobrusin Law Firm, P.C.

(57) ABSTRACT

A work-piece transfer apparatus, comprising at least one work-piece engagement structure; at least one first robot arm pivotally connected to the work-piece engagement structure; a first motor coupled to the first robot arm and being adapted for translating the first robot arm fore and aft in a generally horizontal direction; a second motor; at least one second robot arm being in operating driving relationship with the second motor and operatively coupled with the work-piece engagement structure for raising and lowering the work-piece engagement structure; and a support structure for supporting the apparatus or portions thereof; wherein the first motor and second motor are operated synchronously to raise, lower, and/or translate the work-piece engagement structure in a fore and aft direction by way of one or both of the first robot arm and second robot arm.

20 Claims, 15 Drawing Sheets

(51) Int. Cl.
*B23Q 1/54* (2006.01)
*B23Q 7/00* (2006.01)
*F16H 1/32* (2006.01)

(52) U.S. Cl.
CPC ............. *B23Q 1/5481* (2013.01); *B23Q 7/00* (2013.01); *F16H 2001/325* (2013.01)

(56) References Cited

U.S. PATENT DOCUMENTS

| | | | |
|---|---|---|---|
| 4,966,274 A * | 10/1990 | Willenbrock | B65G 25/02 198/621.2 |
| 4,988,261 A | 1/1991 | Blatt | |
| 5,092,449 A | 3/1992 | Bolin et al. | |
| 5,293,107 A | 3/1994 | Akeel | |
| 5,355,744 A | 10/1994 | Yanagisawa | |
| 5,476,358 A | 12/1995 | Costa | |
| 5,611,248 A | 3/1997 | Peltier | |
| 5,971,254 A | 10/1999 | Naud et al. | |
| 6,220,813 B1 | 4/2001 | Launiere | |
| 6,371,277 B1 | 4/2002 | Malinie | |
| 7,344,017 B1 | 3/2008 | Taguchi | |
| 2003/0007774 A1 * | 1/2003 | Christopher | B08B 3/12 385/147 |

FOREIGN PATENT DOCUMENTS

| | | |
|---|---|---|
| EP | 1492649 A1 | 7/2003 |
| GB | 2053148 A | 2/1981 |
| WO | 2009/035490 A1 | 3/2009 |

OTHER PUBLICATIONS

International Preliminary Examining Authority for Application No. PCT/US2014/067654 dated Apr. 15, 2016.

* cited by examiner

MULTIPLE AXIS WORK-PIECE TRANFSER APPARATUS

CLAIM OF BENEFIT OF FILING DATE

The present application claims the benefit of the filing date of U.S. Application Nos. 61/909,759, filed Nov. 27, 2013, and 62/041,348, filed Aug. 25, 2014, both of which are incorporated by reference in their entireties.

FIELD

In general, the present teachings relate to an improved work-piece transfer apparatus, and particularly a work-piece transfer apparatus that has multiple mechanical links driven by multiple servo motors that control work-piece engagement structures.

BACKGROUND

In various work-piece operation systems there is a need for transferring work-pieces from one station to another to allow for different operations to be performed upon the work-piece. One approach to transferring work-pieces is to employ a walking beam apparatus. Transferring work-pieces may employ linear motion actuation methods. There is an ongoing need for an improved apparatus that is efficient, compact and requires relatively little maintenance. There is also an ongoing need for an improved apparatus that can be efficiently controlled and operated, and can be used to advance multiple work pieces along multiple stations in a work piece operation system.

SUMMARY

The present teachings meet one or more of the above needs by providing an improved work-piece transfer apparatus. The work-piece transfer apparatus makes advantageous use of one or more robot arms for driving a work-piece support structure upward and downward, and generally in a horizontal direction. The one or more robot arms can be employed to effectuate a travel path that combines upward, downward, and/or horizontal direction components. The one or more robot arms may be used to create a walking beam apparatus.

The present teachings contemplate a work-piece transfer apparatus, comprising at least one generally elongated work-piece engagement structure; at least one first robot arm having a first end portion and a second end portion, the first end portion being pivotally connected to the at least one generally elongated work-piece engagement structure; a first motor coupled to the at least one first robot arm at the second end portion and being adapted for translating the at least one robot arm fore and aft in a generally horizontal direction; a second motor; at least one second robot arm having a first end portion and a second end portion, the first end portion of the at least one second robot arm being in operating driving relationship with the second motor, and the second end portion operatively coupled with the at least one generally elongated work-piece engagement structure for raising and lowering the at least one generally elongated work-piece engagement structure; and an optional support structure (e.g., a sub-plate or bolster plate) for supporting the first and second motor, the at least one first robot arm, the at least one second robot arm, and the at least one generally elongated work-piece engagement structure.

The present teachings contemplate a work-piece transfer apparatus comprising: at least one generally elongated work-piece engagement structure; a linear actuation motor coupled with the at least one generally elongated work-piece engagement structure, at least one first robot arm having a first end portion and a second end portion, the first end portion being connected to the at least one generally elongated work-piece engagement structure; a first motor coupled to the at least one first robot arm and at least one generally elongated work-piece engagement structure; at least one second robot arm coupled with the second end portion of the at least one first robot arm; a second motor coupled to the at least one first robot arm and the at least one second robot arm; a base for supporting the at least one first robot arm, the at least one second robot arm, and the at least one generally elongated work-piece engagement structure and mounting the apparatus to a structure; and a third motor coupled to the base and the at least one second robot arm; wherein the linear actuation motor is operated to provide linear movement in a longitudinal or transverse direction in relation to the structure; wherein the first motor is operated to maintain a desired orientation of the at least one generally elongated work-piece engagement structure; and wherein the second and third motors are operated synchronously to raise and lower the at least one generally elongated work-piece engagement structure, and translate the at least one generally elongated work-piece engagement structure in a fore and aft direction by way of one or both of the at least one first and second robot arms.

The present teachings relate generally to a work-piece transfer apparatus comprising at least one generally elongated work piece structure by robot arm arrangement. The robot arm arrangement may include two or more robot arms, each arm adapted to be driven by at least one motor (e.g., a servo motor). For example, a pair of robot arms (which may be located on the same side of the apparatus as each other) may be driven by a motor (e.g., a servo motor). The motors may be operated synchronously to raise and lower the at least one generally elongated work-piece engagement structure, and translate the at least one generally elongated work-piece engagement structure in a fore and aft direction by way of one or both of the at least one first and second robot arms.

One or more arms may be driven, by way of a gear reduction mechanism (e.g., a cycloid gear reduction mechanism). The gear reduction mechanism may be integrally formed as part of a robot arm. For example, the robot arm may be configured to integrally have formed a structure to receive a plurality of collector pins that facilitate motion by a cycloid gear.

In general, the present teachings may include a work-piece transfer apparatus, comprising at least one work-piece engagement structure; at least one first robot arm pivotally connected to the work-piece engagement structure; a first motor coupled to the first robot arm and being adapted for translating the first robot arm fore and aft in a generally horizontal direction; a second motor; at least one second robot arm being in operating driving relationship with the second motor and operatively coupled with the work-piece engagement structure for raising and lowering the work-piece engagement structure; and a support structure for supporting the first and second motor, the first robot arm, the second robot arm, and the work-piece engagement structure; wherein the first and second motors are operated synchronously to raise, lower, and/or translate the work-piece engagement structure in a fore and aft direction by way of one or both of the first and second robot arms. Raising, lowering, or translation may be assisted or caused through one or more gear reduction mechanisms. The one or more gear reduction mechanisms may be at least partially housed within one or more of the robot arms.

As part of the general teachings herein, applicable to the various embodiments contemplated, it may be possible for one motor to be mounted to and carried on a structure translatable by another motor (e.g., a motor may be mounted to a robot arm that is translated by another motor). Thus, raising and lowering may be performed by one motor and pitch may be performed by another motor. Another motor may be used to provide linear motion along a longitudinal or transverse axis of the apparatus or of a structure the apparatus is associated with.

DETAILED DESCRIPTION

Figure 1:
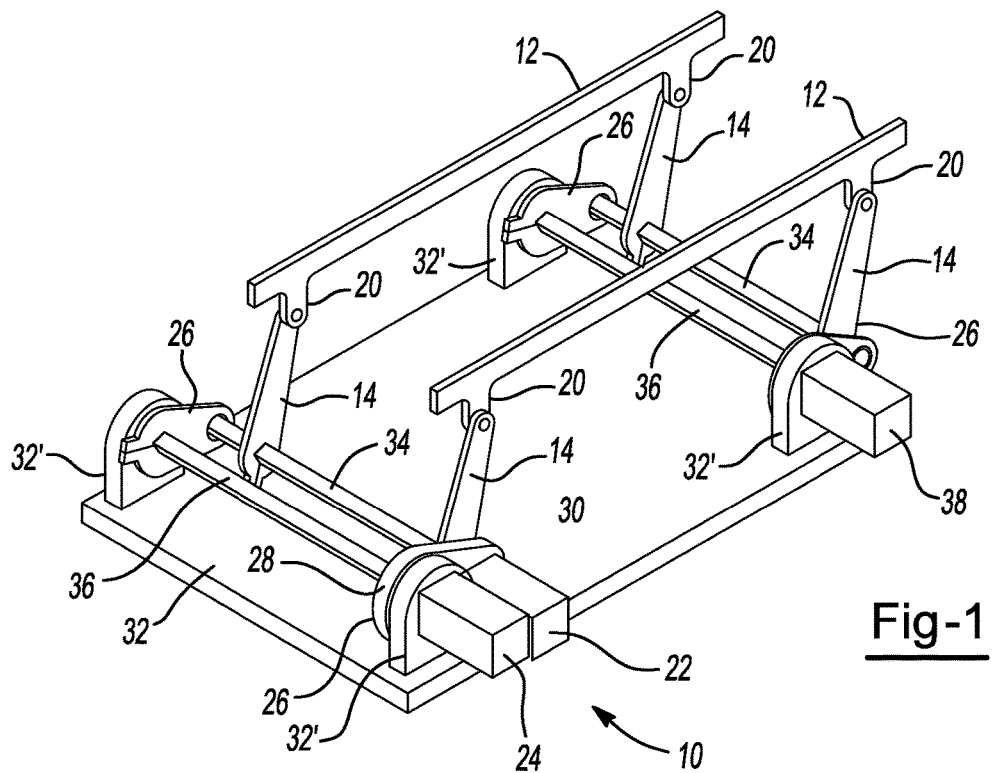
FIG. 1 is a perspective view of an apparatus in accordance with the present teachings.
Figure 2:
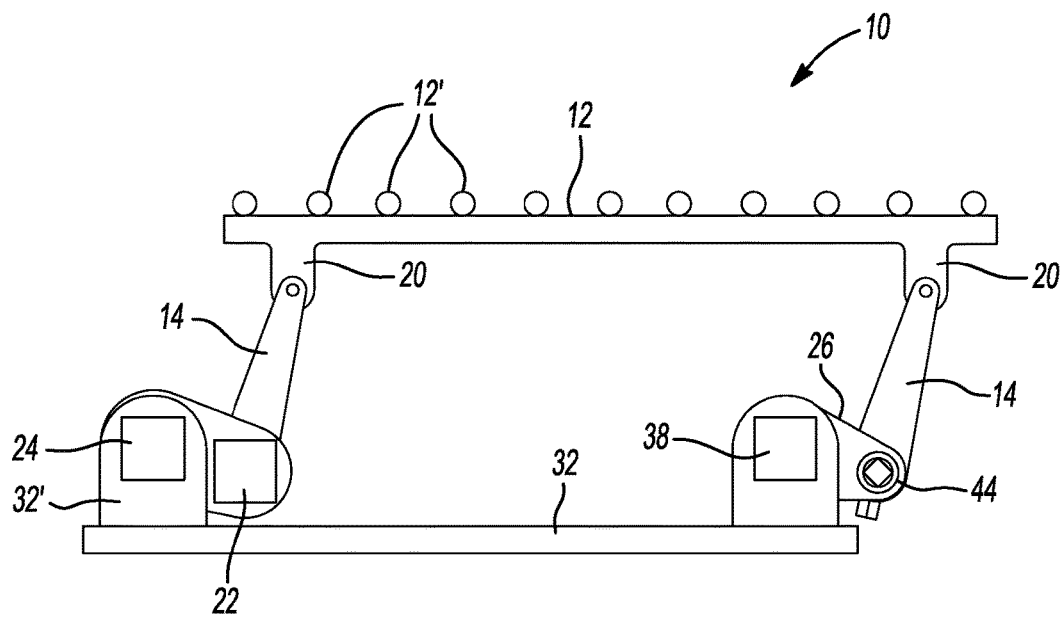
FIG. 2 is a side view of the apparatus of FIG. 1.
Figure 3:
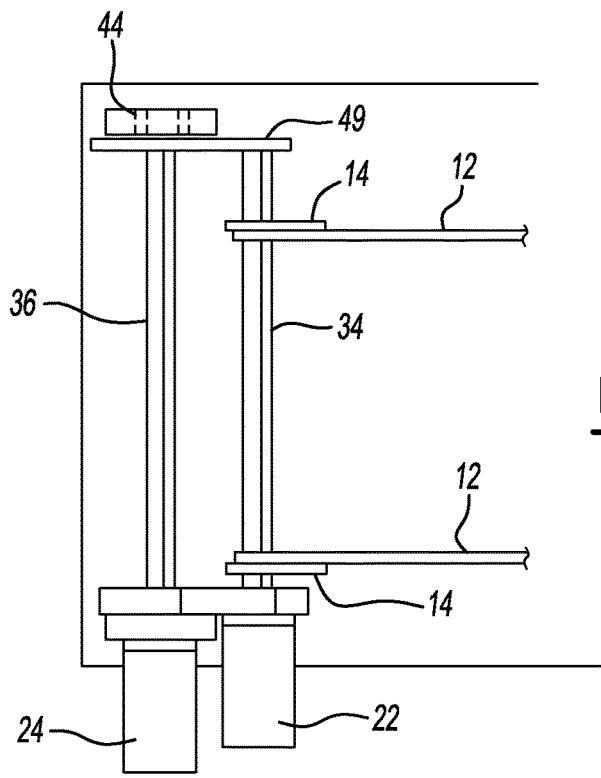
FIG. 3 is a top view of an end portion of the apparatus of FIG. 1.

As required, detailed embodiments of the present teachings are disclosed herein; however, it is to be understood that the disclosed embodiments are merely exemplary of the teachings that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present teachings.

While exemplary embodiments are described above, it is not intended that these embodiments describe all possible forms of the teachings. Rather, the words used in the specification are words of description rather than limitation, and it is understood that various changes may be made without departing from the spirit and scope of the teachings. Additionally, the features of various implementing embodiments may be combined to form further embodiments of the teachings.

By way of illustration, the present teachings may include a work-piece transfer apparatus, comprising at least one work-piece engagement structure; at least one first robot arm pivotally connected to the work-piece engagement structure; a first motor coupled to the first robot arm and being adapted for translating the first robot arm fore and aft in a generally horizontal direction (or for raising and lowering the work-piece engagement structure); a second motor; at least one second robot arm being in operating driving relationship with the second motor and operatively coupled with the work-piece engagement structure for raising and lowering and/or translating (e.g., fore and aft in a generally horizontal direction) the work-piece engagement structure; and a support structure for supporting the first and second motor, the first robot arm, the second robot arm, and the work-piece engagement structure; wherein the first and second motors are operated synchronously to raise, lower, and/or translate the work-piece engagement structure in a fore and aft direction by way of one or both of the first and second robot arms. The teachings herein also include a third motor for effectuating additional movement of the apparatus (e.g., creating another axis of movement).

The teachings herein envision a work-piece transfer apparatus (such as a walking beam apparatus) that includes at least one work-piece engagement structure (e.g., a bar, an element for supporting and/or attachment of tools for holding a work-piece, or other surface) adapted for engaging a work-piece and transferring the work-piece within a work-piece operation system adapted for performing one or more operations upon the work-piece (e.g., shaping the work-piece (e.g., by a press), attaching two or more components of the work-piece (e.g., by one or more of welding, by fastening, by adhering, by crimping, or otherwise)), at the work-piece operation system's progressive operation stations. A lifting robot arm device operatively engages the work-piece engagement bar, the robot arm device being adapted for translation upwardly and downwardly, and horizontally in the work-piece transfer direction and horizontally in the direction opposite to the work-piece transfer direction relative to the work-piece operation system. As with all robot arm translation teachings herein, it will be appreciated that the above thus also contemplates a combined series of minute translations, the effect of which is to give the appearance of one or more arcuate motions. Optionally, a second rearward work-piece engagement bar may be operatively engaged by arms attached to the robot arms by a shaft connected to the first robot arm that rotates at the same center as the robot arms. The lifting robot arm may be motor driven, and may be synchronously controlled in a manner so that when the lifting robot arm devices translates upwardly, downwardly, and/or horizontally, another optional lifting robot arm device may also translate generally upwardly, downwardly, and/or horizontally in a substantially similar manner. One or more of the lifting robot arm devices may include a mounting portion adapted to be mounted in a fixed position relative to the work-piece operation system (e.g., to a sub-plate or bolster plate). The robot arms may include a first arm pivotally connected to the mounting portion at a first joint. At least one second arm may be pivotally connected to the first arm at at least one second joint. The at least one second arm may be connected to a work-piece engagement bar for the purpose of providing the horizontal movement to the work-piece engagement bar(s). The second arm may be motor driven, and the second horizontal movement robot arm may be linked to the motor driven horizontal movement robot arm device by the work-piece engagement bar(s) such that when one of the horizontal movement robot arm devices translates horizontally, the other horizontal movement robot arm device also translates generally horizontally in a substantially similar manner. The arms can be any size or shape depending on the application. It is also contemplated that other configurations of the assembly may include a first arm that translates generally horizontally and a second arm that translates generally upwardly and/or downwardly. It is thus possible that a subassembly may include a first motor that is maintained in a stationary position relative to a support structure of the assembly. At least one second motor may be married on a robot arm and thus may have its position moved, such as relative to a support structure.

The walking beam work-piece transfer apparatus may include one or more motors (e.g., a servo motor), such as a motor adapted for closed loop control based on sensing the location of the output shaft. The motor may be adapted to be controllably operated and may have inputs for power and for communicating with a suitable controller (e.g., a programmable logic controller). A suitable controller may control the operation of the motor based upon signals from the motor that correspond with a positional location of the motor output (e.g., a drive shaft). The motor may have a drive shaft. The drive shaft may be generally cylindrical in its outer shape. One or more motors may also include a motor adapter plate that allows the motor to be attached to a base within the assembly, allows the motor to engage with a gear reduction mechanism, or both. The assembly may include a motor (e.g., a Schneider Electric motor, Model No. BMH100/P12A2A or one having similar structural and/or functional characteristics, whether having similar power output or not), an elongated drive shaft attachment portion (e.g., a coupler), and one or more gear reduction mechanisms (e.g., a gear box).

The elongated drive shaft attachment portion may include a first motor connection portion adapted to be connected with the output shaft of the motor and a second gear box interface portion adapted to interface with a gear reduction mechanism. It is also contemplated that the motor output shaft (e.g., drive shaft) may be integrally formed with the elongated drive shaft attachment portion. The first motor connection portion may be adapted to be press-fitted or otherwise assembled onto the motor output shaft (e.g., drive shaft). For example, the elongated drive shaft attachment portion may have a longitudinal axis (e.g., generally aligned with the longitudinal axis of the motor drive shaft) that is oblong on an inside wall in its transverse cross-section. The elongated drive shaft attachment portion may be adapted to change the transverse cross-sectional shape in response to an applied pressure so that the shape generally corresponds with the shape of the motor output shaft (e.g., drive shaft). When the pressure is applied, the elongated drive shaft attachment portion may be placed over the motor output shaft (e.g., drive shaft). When the pressure is released, the elasticity of the material (e.g., a suitable spring steel, such as AISI 1095 grade steel) may cause the inner wall to return toward its original shape, thereby engaging the drive motor output (e.g., drive shaft) in a press-fit manner. The elongated drive shaft attachment portion may have a wall thickness of about 10 mm or less (e.g., in a range of about 1 mm to about 7 mm or about 2 mm to about 5 mm).

The elongated drive shaft attachment portion may join the first motor connection portion and the gear box interface portion. The gear box interface portion may have an engagement portion (e.g., at an end opposite the motor connection portion) adapted to fittingly interface with the gear reduction mechanism. The gear reduction mechanism may have a complementary shape structure for connection with the elongated drive shaft attachment portion. For example, the engagement portion may have a male or female connector portion that engages respectively an opposing male or female connector portion (e.g., of the gear reduction mechanism). One particular possibility is to have the engagement portion have at least one surface oriented relative (e.g., generally parallel or at some angle less than about 75°) to the longitudinal axis that has a flat component. For example, it may be generally rectangular.

The gear reduction mechanism may have one or more stages of gear reduction. One or both of the motors may drive a cycloid gear reduction mechanism associated with one or more of the robot arms. For instance, a cycloid gear reduction mechanism may be integrally mounted to and formed as part of the first arm, the second arm or both. One or both of the motors may drive a planetary gear reduction mechanism associated with one or more of the robot arms. A single motor may drive an individual robot arm. A single motor may drive multiple arms. One or more arms may be employed that are not associated and/or do not contain a gear reduction mechanism and/or an attached motor. For instance, such arms may be located in the apparatus on a side of the apparatus opposite the driving arms, and/or on the same side as the driving arms but downstream from them. A width between opposing work-piece engagement bars may be adjustable along a common shaft.

As indicated, a cycloid gear reduction mechanism, planetary gear reduction mechanism, or other gear reduction mechanism may be employed (e.g., between a motor and a robot arm). A gear reduction mechanism may be at least partially integrated into a robot arm and may be in operative driving relationship with one or more of the motors. Any gear reduction mechanism employed may have a reduction ratio of at least about 2:1, 3:1, 4:1, 6:1, 10:1, 30:1, 50:1, 90:1, or even 150:1. A cycloid gear assembly, planetary gear assembly, or both, may be at least partially integrated into a robot arm.

The cycloid gear assembly may be operatively positioned between a motor (e.g., an output shaft of a drive motor) and a driven arm of a robot assembly, or otherwise at least partially integrated with a robot arm (e.g., at least partially housed within a structure defining the robot arm). Desirably the operative relationship between a motor and a robot arm is such that output (e.g., rotary output) from a drive motor (e.g., a servo motor) serves to rotatably drive a cycloid gear (such as about a rotational axis of drive motor). The cycloid gear has a periphery (e.g., an outer periphery) that rotates in a generally eccentric manner. The periphery may include teeth or some other surface that operatively engages a fixed structure associated with a base of the robot arm. One or more output members (e.g., collector pins, such as made of bearing steel), which may be in driven relationship with the cycloid gear, collect rotary motion from the cycloid gear, while essentially ignoring orbital motion of the cycloid gear.

The output members, in turn, rotate about a rotational axis of the cycloid gear. In turn, from the rotation, the output members cause a driven portion of the robot arm to move. The cycloid gear assembly (or another gear reduction assembly) as described above may be employed with one or more (or all) of the motors employed herein.

Another gear reduction mechanism or gear reduction mechanism stage may be employed instead of or in addition to the cycloid gear reduction mechanism (e.g., before the cycloid gear reduction mechanism, after the cycloid gear reduction mechanism, or generally simultaneously with the cycloid gear reduction mechanism). For example, a suitable planetary gear reduction mechanism may be employed. The elongated drive shaft attachment portion coupled with the motor output shaft (e.g., drive shaft) may be operatively in engagement with an eccentric drive portion. The eccentric drive portion may include a planetary gear assembly. For example, the planetary gear assembly may include a planet carrier that mounts to an eccentric structure and operatively receives elements of the planetary gear assembly that may include a centrally disposed sun gear, a plurality of radially disposed planet gears, and a circumscribing ring gear. The planet gears may be adapted for rotation by way of a plurality of respective axles that are received within the gears and the planet carrier. The gear ratio may be about 3:1, 4:1, 5:1, 6:1 or higher. The eccentric structure may include an elongated shaft portion having a plurality of eccentrics that are out of phase with each other and formed or attached to the shaft. The eccentric structure may function as an axle in the gear reduction mechanism. The planetary gear assembly may be adapted to be carried within an output structure of the gear reduction assembly (e.g., a torque plate), carried within and between the driven arm and the eccentric structure serving as an arm pivot axle, or both. The torque plate may contain the gears axially, which may function to be driven by one arm and to drive another arm. A torque tube may be welded or otherwise attached to the torque plate. Both arms driven by the first motor may be connected to the torque tube.

The apparatus of the present teachings may be employed in combination with one or more work stations along which a work-piece is advanced. The apparatus of the present teachings may be employed in combination with one or more work-piece support members (e.g., one or more slats, walls, and/or beams). The apparatus of the present teachings may be employed with one or more work-piece shaping stations, such as a press. The one or more work stations may include work-piece modification tooling, one or more work-piece support members, or both. The one or more work-piece support members serve to support a work-piece as the work-piece is advanced in a downstream direction along the apparatus, and while the work-piece engagement structures are returned in an upstream direction along the apparatus. The one or more work-piece support members may be stationary. For example, they may be fixed in position by one or more posts or other upright structures. The upright structures may be secured or rest upon the apparatus support structure (e.g., a sub-plate or a bolster plate). The one or more work-piece support members may have a generally flat upper surface for contacting a work-piece (or plurality of work-pieces). The one or more work-piece support members may include one or more notches, cut-outs, grooves, slits, or other openings into which one or more work-pieces are supportably received. The one or more work-piece support members may be positioned between and/or outside of the elongated work-piece engagement structures. The one or more work-piece support members may be positioned generally parallel with the work-piece engagement structures. The one or more work-piece support members may be positioned so that as any work-piece engagement structure advances a work-piece, such work piece engagement structure elevates above an upper surface of the work-piece support members. Other arrangements are also possible. For example, the one or more work-piece support members may carry a support surface from a lower surface of the work-piece support member. For example, there may be a hook, a well, or the like that hangs below the work-piece support member and into which an advancing work-piece is received, without elevating the work-piece or the elongated support member above the height of the upper surface of the work-piece support member.

Either or both of any elongated support structure or work-piece support member may have one or a plurality of longitudinally oriented spaced openings (e.g., throughholes and/or elongated slots). Such openings may receive one or more pins or fasteners. For example, one or more openings in the elongated support structure may receive hardware for pivotally coupling an arm (e.g., a robot arm as described herein).

The apparatus support structure may include one or a plurality of slots. For example, it may include a plurality of slots oriented transversely and/or in a parallel direction relative to the direction of travel of a work-piece. Any such slots may extend from one side of the apparatus support structure to the other side, or only partially therebetween. The slots may be generally an inverted T-shaped. Hardware mounted to the apparatus support structure via the slots may have a complementary inverted T-shape, so that the hardware resists pulling through the slots by lateral projections. Due to the spacing and number of slots, it is possible to vary the arrangement of components on the structure to meet the dimensional needs for a particular application.

As will be appreciated, any of a number of combinations of motors, gearbox structures, robot arms, and/or support structures or workstation configurations may be employed. It is possible that a robot arm will be free of any gear reduction structure. It is possible that a robot arm will have a portion that is integrally formed with the arm to include or otherwise house a portion of the gear reduction structure. Multiple arms may be employed. A single robot arm may be operatively connected to two motors. A single motor may operatively drive multiple robot arms. One or more robot arms may be carried on a common transverse shaft.

Various teachings herein may be employed in various applications. The teachings are not limited to a walking beam apparatus. It is possible for the teachings to be implemented in a number of work-piece transfer operations. One approach contemplates employing a press that includes a crown, a bolster/bolster plate, or both. Robotic arms as taught in the preceding text may be mounted to a bolster plate of the press. Robotic arms may be mounted to a crown of a press. Robotic arms may be mounted at an intermediate location between the bolster and the crown of a press, such as at one or more upright support members. The press may have a forward portion, a rearward portion and opposing side structures that extend between the forward and rearward portions. The press may have a longitudinal axis and a transverse axis. The robotic arms may be mounted in a direction so that they have an axis of rotation that is generally parallel with the longitudinal axis of the press, the transverse axis of the press, or a direction in between.

A suitable mounting structure may be employed for securing the robotic arms to the press. The robotic arms may be secured to the press by a base. For example, the base may include a cross member that extends between opposing upright support members of the press and the cross member is mounted to the upright support members. The base may include a stanchion or other support member for attaching and/or securing the robotic arms to the bolster plate of a press or the crown of a press.

The robotic arms for use in this application may include one, two, three, or more servo motors for effectuating motion of the arms. There may be one, two, three, or more cycloid assemblies that define rotational joints (e.g., the area where arms are joined or connected). For example, one approach may be to employ a mounting structure that is fixedly attached to upright support members of a press. Attached to the mounting structure will be a first joint that includes a portion that connects to a mounting bracket, a robot arm that is coupled with the connection portion and includes an integrated gear box, a motor that drives the gear box for effectuating rotation of a first robot arm about an axis that is generally parallel with the axis of the mounting structure. Toward an opposite end of a first robot arm, there will be a second joint that includes a second gear box and a motor for effectuating rotation of a second robot arm in a direction that differs, or is the same, from the direction of the first robot arm. The second robot arm is connected to a third joint (effectively a wrist joint) that can, in turn, attach to a work-piece engagement structure or tool. The third joint may help to keep the work-piece engagement structure or tool oriented in a desired position. One or more motors may be associated with the third joint and work-piece engagement structure. For example, a motor acting as a wrist motor may help to keep the work-piece engagement structure in the desired position (e.g., to maintain desired orientation even as the arms are moving). A linear actuation motor may also be employed to provide linear motion actuation of the work-piece engagement structure or tool. The motor may employ linear motion directly or may include methods of converting rotary motion (e.g., from a rotary motor) to linear motion. This can be accomplished using methods such as a lead screw drive, belt drive, or linear servo motor drive. This may allow for movement of the work-piece engagement structure in a direction that is generally perpendicular to the axis of rotation of the first robot arm, second robot arm, or both. Effectively, rotation about three respective axes can be accomplished. Labels such as first robot arm and second robot arm and first motor and second motor are used herein for clarity to differentiate one arm or motor from another. The first robot arm, for example, is not limited to the arm that is coupled to a mounting bracket. Instead, the first arm can be the arm coupled to a work-piece engagement structure, for example.

With reference to FIGS. 1 through 4b, there is illustrated a work-piece transfer apparatus 10 for a multi-station work-piece operation system. The apparatus is a walking beam apparatus. The apparatus includes at least one generally elongated work-piece engagement structure 12. It is shown as having a pair of generally parallel structures 12. The work-piece engagement structure 12 may be adapted to support or carry finger members 12' (which may form a part of the apparatus) or another supported structure, such as a work-piece. The work piece engagement structure 12 may instead include one or more recessed portions or depressions to serve as a nest for a work-piece. Any work-piece engagement structure may be suitably configured for receiving and/or transporting a desired work-piece. It may include one or a plurality of finger projections for supporting at least a portion of a work-piece, one or a plurality of nests, notches or other depressions for receiving at least a portion of a work-piece, or both. The apparatus may include at least one first robot arm 14 having a first end portion 16 and a second end portion 18, the first end portion 16 being pivotally connected to the at least one generally elongated work-piece engagement structure 12 (e.g., via downward projections 20). As seen, the robot arms herein may have one end that is wider than an opposing end.

A first motor 22 (e.g., a servo motor, which may be programmably operated or controlled) may be coupled (e.g., pivotally or in a fixed relationship) to the at least one first robot arm 14 at the second end portion 18. The coupling is such that it allows for translating the at least one first robot arm 14 fore and aft in a generally horizontal direction.

A second motor 24 may be employed. The second motor may be coupled with at least one second robot arm 26 having a first end portion 28 and a second end portion 30, the first end portion of the at least one second robot arm being in operating driving relationship with the second motor, and the second end portion operatively coupled with the at least one generally elongated work-piece engagement structure (e.g., via the at least one first robot arm) for raising and lowering the at least one generally elongated work-piece engagement structure. The second motor 24 is seen as being generally fixed in place. The first motor 22, however, may be translatable, such as in response to motion caused by the second motor.

A support structure 32 (e.g., a sub-plate or bolster plate) may be employed for supporting the first and second motor, the at least one first robot arm, the at least one second robot arm, and the at least one generally elongated work-piece engagement structure. As can be appreciated from the drawings, the first and second motors can be operated synchronously to raise and lower the at least one generally elongated work-piece engagement structure, and translate the at least one generally elongated work-piece engagement structure in a fore and aft direction by way of one or both of the at least one first and second robot arms. The shafts may be supported by a stanchion 32' or other suitable fixed base having an opening therein for receiving the shaft.

As noted, the apparatus may include at least two generally parallel and spaced apart generally elongated work-piece engagement structures 12. The at least two generally parallel and spaced apart generally elongated work-piece engagement structures may be supported by at least one common transverse shaft 34. The at least one common transverse shaft 34 may be adapted to be driven by at least the first motor 22. It may also be driven indirectly by the second motor 24, inasmuch as the second motor 24 may cause the first motor 22 to raise or lower along with the shaft 34.

The apparatus may include a transverse shaft 36 that is adapted to be driven by the second motor 24.

With reference again to the apparatus as a whole, it is seen that a third motor may be employed downstream to supplement either or both of the motions caused by the first and/or second motors. For instance, a third motor 38 may be adapted for performing a similar function as the second motor 24 and/or the first motor 22.

Figure 4A:
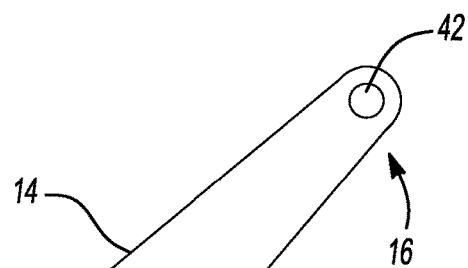
FIG. 4A is a side view of an arm useful in the apparatus of FIG. 1.
Figure 4B:
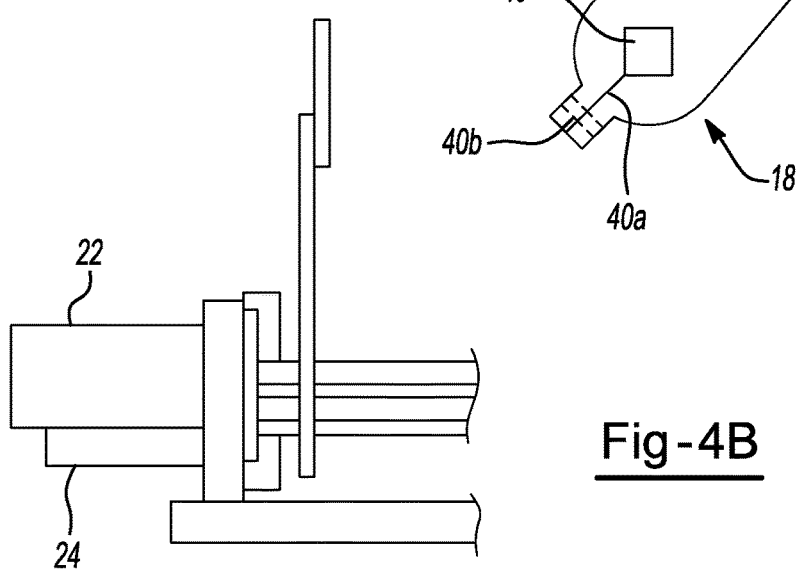
FIG. 4B is a sectional view of a corner portion of the apparatus of FIG. 1.

One or more robot arms may be shaped to have rounded ends. One end may have a radius of curvature that is larger than the radius of curvature at the other end. Side walls may be wider apart at the end having the larger radius of curvature and may taper toward the end with the smaller radius. The robot arms may be configured to receive at least a portion (and conceal from view) of a gear reduction mechanism, such as a cycloid gear assembly. One or more of the robot arms may have the shape of FIG. 4a. The robot arms may be adapted to receive one or more transverse shafts. For example, as seen in FIG. 4a, they may include an opening 40 for receiving one of the transverse shafts (e.g., in a fixed relationship as shown in FIG. 4b, or alternatively in a pivotal relationship (such that it may include a generally circular or otherwise rounded opening)). One or more arms may include another opening (e.g., an opening 42 as in FIG. 4a) for defining a pivotal connection with the work-piece support structure. As can be appreciated from the drawing of FIG. 4a, the opening 40 adjoins a slit 40a the width of which can be adjustably opened or closed, such as by a screw 40b that can be used to compressively attach the arm around a shaft.

One or more bearings (e.g., bearings 44) may be employed at the locations where any of the robot arms are coupled with the shafts, the motors or both. It is possible that one or more robot arms may be coupled to a shaft in a pivotal manner by employing a cross-sectioned shaft of any shape that penetrates a complementary-shaped opening in a bearing.

Figure 6:
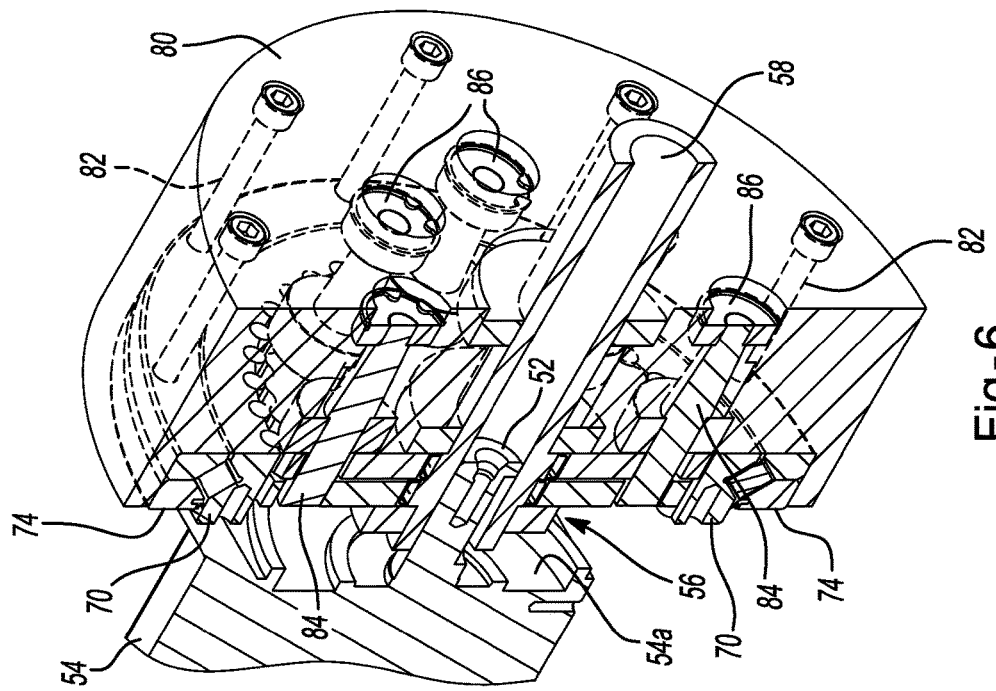
FIG. 6 is another sectional perspective view of a gear reduction mechanism of the present teachings that omits a mounting foot.
Figure 5:
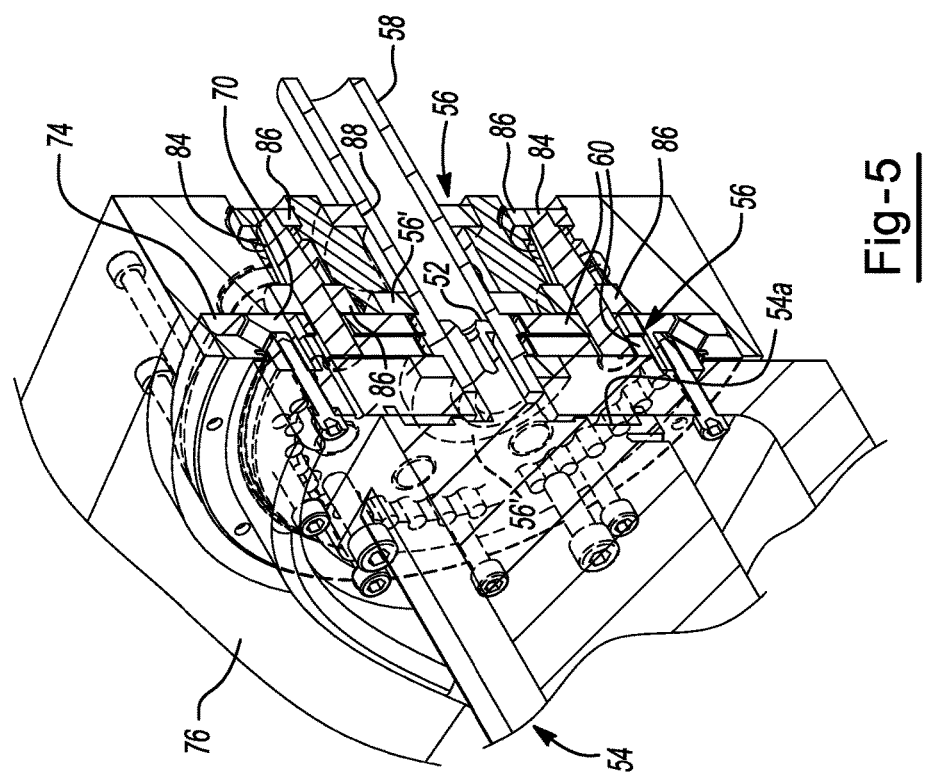
FIG. 5 is a sectional perspective view of a gear reduction mechanism of the present teachings.
Figure 7:
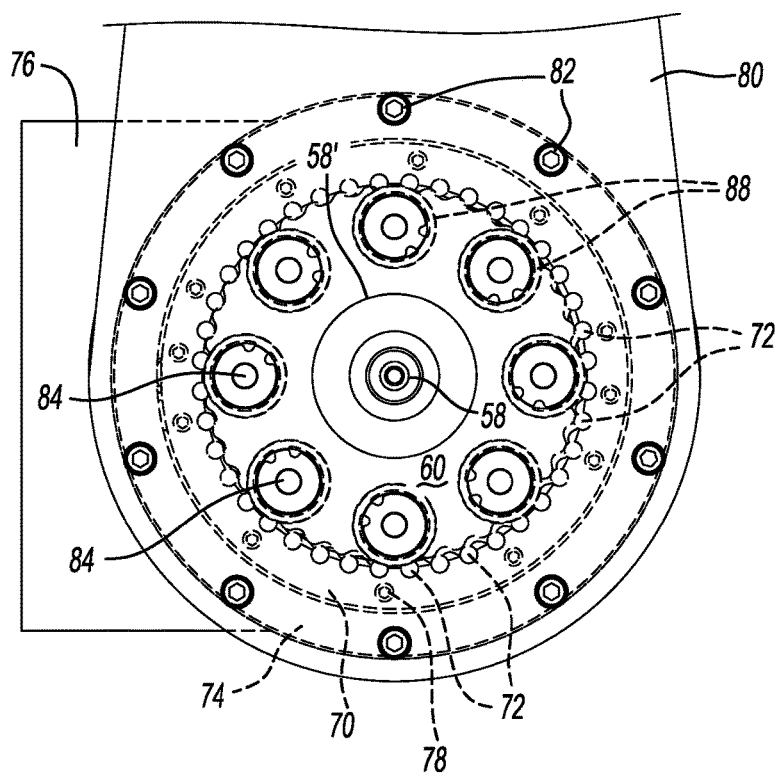
FIG. 7 is a plan view of a section of the mechanism of FIG. 5.
Figure 8:
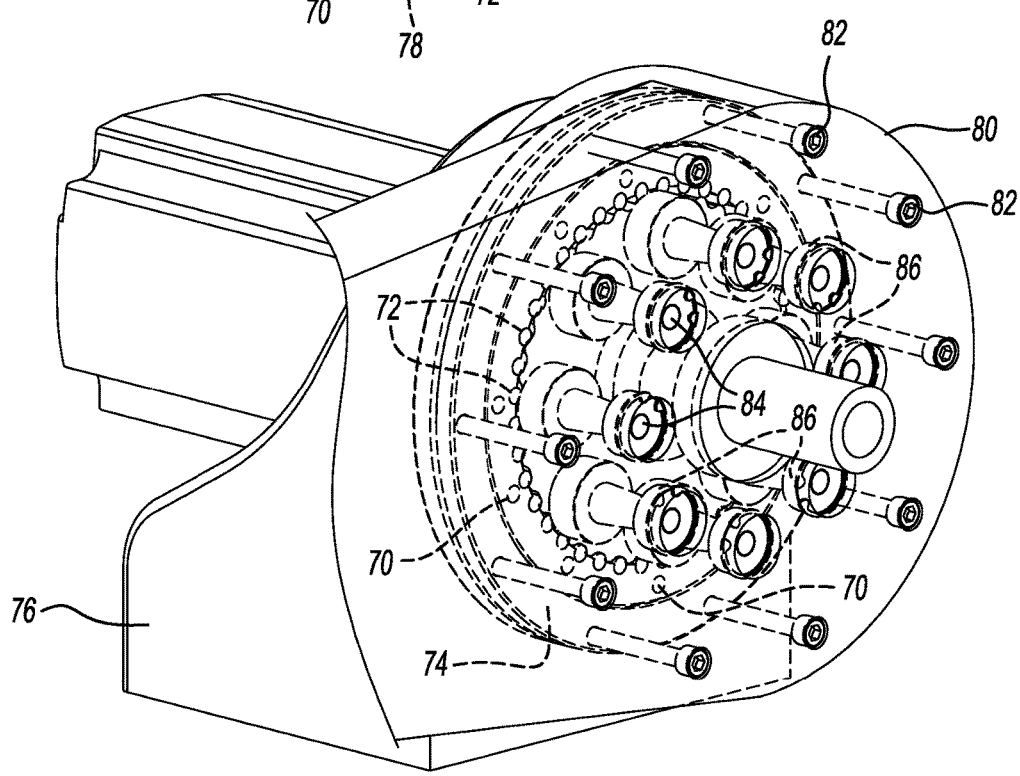
FIG. 8 is a transparent perspective view of the mechanism of FIG. 5.

With more attention to the structure of an illustrative cycloid gear reduction mechanism of the teachings herein, reference is made to an example depicted in FIGS. 5-9. By way of illustration, without limitation, a gear reduction mechanism (e.g., a cycloid gear assembly 50) may be operatively connected with an output drive structure of one or more of the motors (e.g., motors 22, 24, 38). Referring to FIGS. 6-8, it is seen that a motor drive shaft 52 having a longitudinal axis, extends from a motor 54 (e.g. at an end 54a of the motor 54). The motor may be a suitable servo motor (e.g. a servo motor that is programmably or otherwise controllably operated to deliver rotary driving output to the motor drive shaft, which can be employed for driving the cycloid gear assembly). The output drive structure (e.g., drive shaft 52) is adapted to drive an eccentric assembly 56. The eccentric assembly may include one or a plurality of eccentrics, with or without an associated eccentric bearing. For example, an assembly may be suitably balanced, such as by employment of two or more out of phase eccentrics 56'. As seen in FIGS. 5 and 6, one or more eccentrics may be carried on a shaft 58 (e.g., a hollow shaft) having a longitudinal axis. The longitudinal axis of the shaft 58 may be generally in alignment with the axis of rotation of the motor shaft 52. The shaft 58 may be coupled with the motor drive shaft 52 (e.g., it may be integrally formed with the drive shaft, or otherwise matingly fitted over or within the drive shaft). As noted, the eccentric assembly may include multiple (e.g. two or more) eccentrics 56'. The multiple eccentrics may be longitudinally disposed relative to the longitudinal axis of the drive shaft. They may be out of phase relative to each other (e.g. two eccentrics that are 180° out of phase with each other). The multiple eccentrics may be adjoining. They may be spread apart from each other (e.g. they may be longitudinally spaced so that opposing faces may have a gap between them, for example the gap may range from about 0.5 mm to about 50 mm, or about 2 mm to about 30 mm).

One or more cycloid gears 60 may be driven by the one or more eccentrics 56'. For example, two or more cycloid gears 60 may be employed that are driven by two or more respective eccentrics that are out of phase such as for achieving a balanced operation. The cycloid gears may have a generally central opening 62. The opening, which may be a throughhole opening may receive an eccentric (or a bearing associated therewith).

Figure 9:
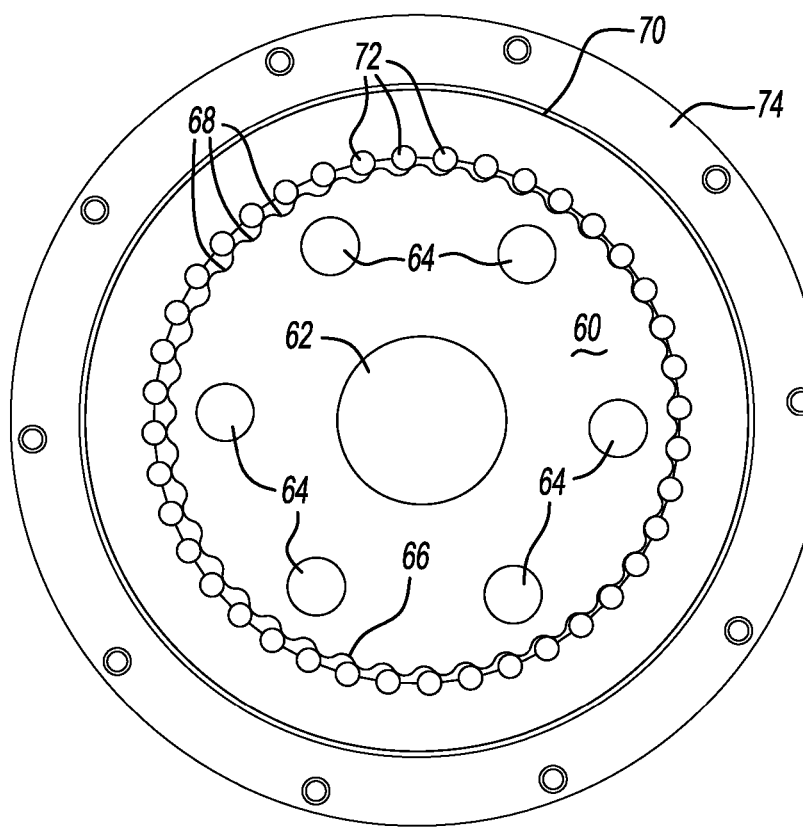
FIG. 9 if a sectional view of a portion of the mechanism of FIG. 5.

The one or more cycloid gears (which may be generally round and have a plurality of spaced apart teeth about its periphery) may include one or more throughhole openings, such as a plurality of radially disposed throughhole openings. The throughhole openings may be generally round and have a diameter or other inner peripheral dimension. For example, as seen in FIG. 9, a plurality of radially spaced throughhole openings 64 are formed in the cycloid gear 60. The throughhole openings are generally circular and have a diameter. A periphery 66 of the cycloid gear 60 is generally round, and has a plurality of teeth 68 spaced apart from each other. Two or more of the cycloid gears may be such that their respective throughhole openings 64 and/or generally central opening 62 are generally in registered alignment with each other.

The cycloid gear may be part of an assembly that includes at least one inner race 70. The inner race 70 may be configured to co-act with the periphery of the cycloid gear, such as by way of an inner peripheral surface of the inner race. The Inner race may function as the axle in the gear reduction mechanism. The inner race may have a plurality of pockets (e.g., on an inner peripheral surface) that receive rolling elements 72 (e.g., in an amount larger than the number of teeth of the cycloid gear). The inner race generally circumscribes the cycloid gear periphery, and may be spaced at least partially about the periphery of the cycloid gear. For example, the inner race 70 generally surrounds the cycloid gear and may be spaced apart from the cycloid gear 60, except for locations where gear teeth of the cycloid gear and the rolling elements intermeshingly engage.

As seen in one illustrated embodiment, the inner race may have a generally circular outer peripheral wall. The inner race may have a generally circular inner wall which may have a plurality of pockets to receive the rolling elements 72. The inner wall of the inner race may be in generally opposing relationship with the periphery of the cycloid gear. The inner wall of the inner race may be adapted so that as the cycloid gear is rotated (e.g. by the rotation of the motor drive shaft 52) a portion of the outer periphery of the cycloid gear radially advances toward a portion of the inner wall of the inner race (see FIG. 9). Simultaneously a portion of the outer periphery of the cycloid gear retreats away from the inner wall of the inner race.

The inner race and the cycloid gear may have a space between them having a plurality of rolling elements (e.g., elongated cylindrical pins, balls, or other rolling elements). For instance the inner surface of the inner race may include a plurality of circumferentially disposed spaces between gear teeth (e.g., pockets) for receiving the rolling elements and thereby defining a rolling element carriage structure.

The outer wall of the inner race may have a cross sectional profile. The profile may be such that the outer wall of the inner race is adapted to rotatably co-act with an inner wall of an outer race, such as by receiving one or a plurality of rolling elements. For example, it may have a generally flat bottom, an arcuate bottom, or both (e.g. a bottom that has a hemispherical indentation). The profile may have opposing upright walls (which may be generally perpendicular to the bottom). It may have a top wall that may be generally flat or include one or more flat portions. It may include an indentation. It may have a suitable configuration to receive one or more rolling elements in a space between the inner race and an outer race 74 (e.g., in a space between the outer wall of the inner race and an inner wall of the outer race. The profile may be generally constant around the inner race. As seen, for example, in FIGS. 5 and 6, the cross sectional profile has a generally flat bottom wall, two generally upright (e.g. perpendicular to the bottom wall) side walls, and a top wall that has a generally flat portion and a centrally disposed indentation.

An average diameter of the cycloid gear relative to the average inner diameter of the inner race may be smaller. The average diameters may be the diameters that take the average depth from crests to bottoms of the gear teeth. The relative size of the diameters may be such that as the eccentric shaft rotates through a single revolution, the cycloid gear rotates in a counter direction by less than a single rotation (e.g. the ratio of rotation of the inner race relative to a rotation of the cycloid gear range from about 5:1 to about 95:1). The inner race may located at least partially within an outer race, e.g., they may each have a common or generally parallel plane of rotation (e.g., a plane that intersects at right angles with an axis of rotation).

The inner race 70 and the outer race 74 of the assembly herein may be positioned for rotational motion relative to each other. The outer race may have an Inner circumferential wall that generally surrounds the outer periphery of the inner race. For example, one of the inner race or outer race may be maintained in a fixed operational position relative to the other race. For maintaining in a fixed position, one of the races may be secured to a fixed structure of a robot arm, such as a mounting foot 76 for a robot arm (such as the stanchion 32' of FIGS. 1 and 2). For instance, one or more fasteners 78 (e.g., head cap screws) may secure the inner race to the mounting foot 76, or to a drive member of a robot arm. The outer race 74 may be held in a fixed position to a driven portion 80 of the robot arm. For instance, it may be mounted by one or more fasteners (e.g. head cap screws 82) to the driven portion 80. Either or both of the outer race or inner race may be made of one integrated piece or a plurality of discrete pieces.

Within each of a plurality of (if not all of) the radially disposed throughhole openings of the cycloid gear may be a suitable member adapted for converting the rotational motion of the cycloid gear into rotary motion for driving a driven portion of a robot arm. For example, a plurality of collector pins 84 may have a diameter that is smaller than the diameter of the throughhole openings. In this manner the rotation of the cycloid gear is collected by the pins, which may also effective ignore orbital motion of the cycloid gear. The collector pins (which may have a longitudinal axis that is generally parallel to the longitudinal axis of the motor drive shaft) may be held in place by one or more bearings (e.g., bearings 86). Such collector pin bearings may be adapted to allow the pins to rotate freely about their rotational axes. Such collector pin bearings may be disposed within a driven portion of a robot arm. For example, bearings 86 may each disposed within a pocket of a driven portion 80 of a robot arm. One or more additional bearings 88 may be employed for aiding rotation of the driven portion of the robot arm.

As can be appreciated from the above, and taking into account the example illustrated in FIGS. 5-9, when the motor 54 rotates its drive shaft 52 about a drive shaft rotational axis, the drive shaft causes the cycloid gear 60 to rotate about a rotational axis (by way of the eccentrics), which, for example, may be aligned with or parallel to the drive shaft rotational axis. The cycloid gear 60 causes the collector pins 84 to rotate (both about their own respective rotational axes and about the rotational axis of the motor drive shaft and the cycloid gear), in turn, translating the driven portion 80 of the robot arm. Gear reduction is thus possible. As also seen, in accordance with the general teachings herein applicable to other embodiments, components of the gear reduction mechanism may be integrated as part of a robot arm. For example, operative components of the gear reduction mechanism may be machined or otherwise formed as part of the robot arm (e.g., an end portion of a robot arm (such as a driving end portion that also carries a motor) may be machined or otherwise formed to receive a plurality of collector pins for facilitating a cycloid gear rotation).

As can be gleaned from the teachings and illustrative examples herein, components can be interchanged so that associated with a driving portion of the robot arm (e.g., the portion of the arm connected to the foot) may be the outer race, and the driven portion of the robot arm may include the inner race.

Figure 10A:
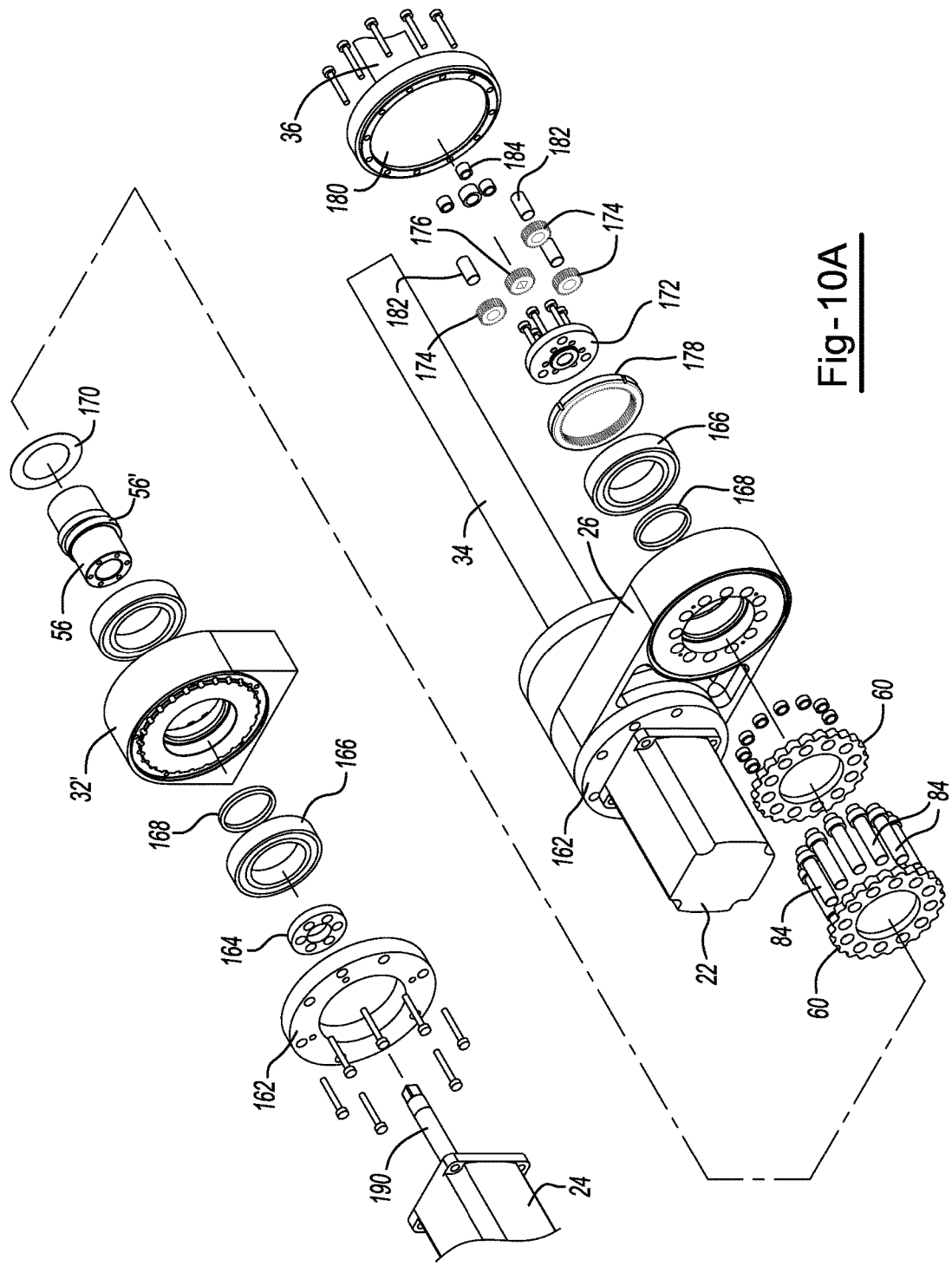
FIGS. 10A and 10B are exploded views of a gear reduction mechanism of the present teachings.
Figure 10B:
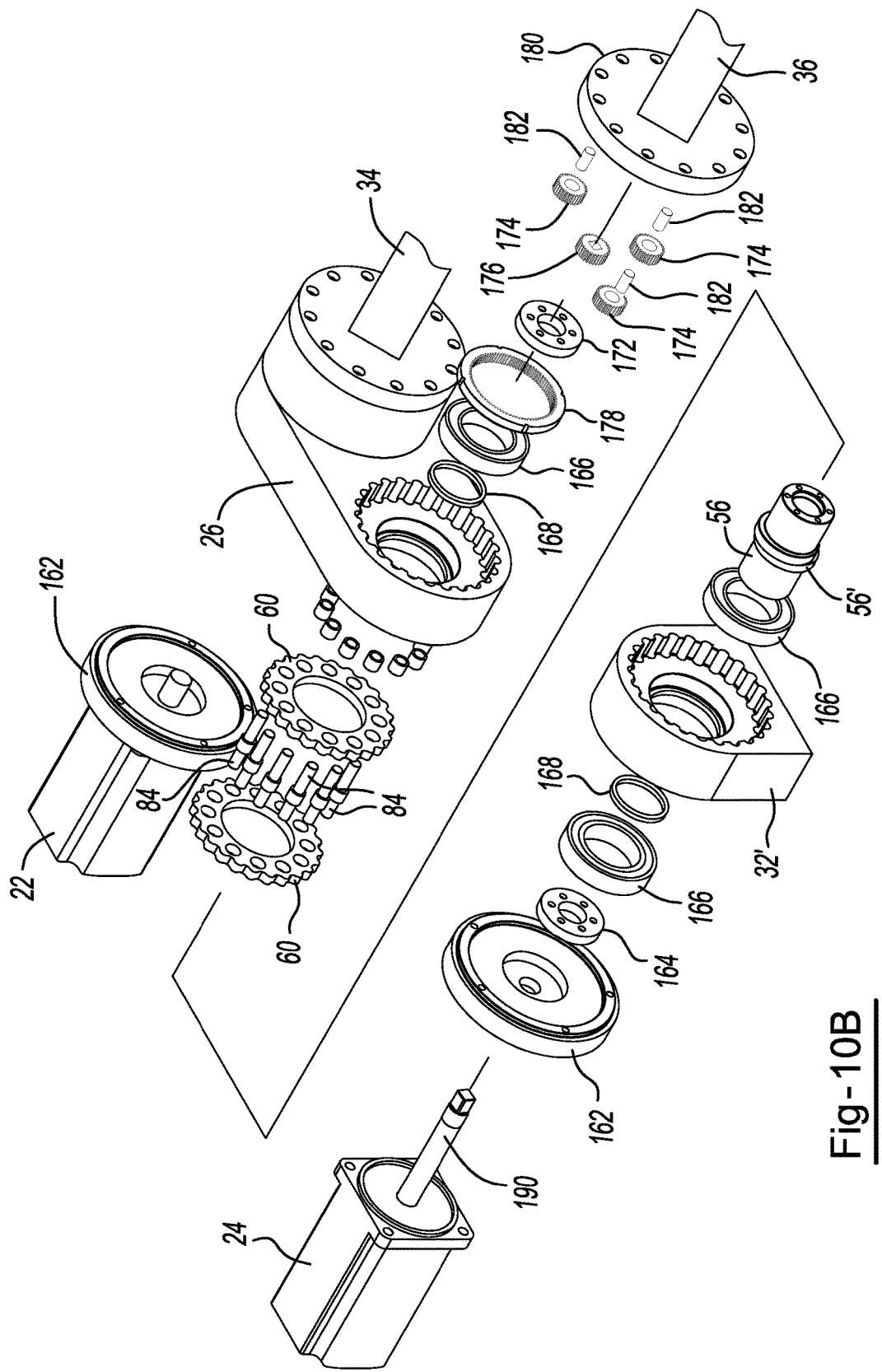

FIGS. 10A and 10B illustrate exploded views of an assembly employing a motorized drive portion coupled with a mount portion for fixing the position of the drive portion. A gear reduction portion housed at least partially within the robot arm causes controlled output from the motorized drive portion to drive a robot arm (e.g., by output from the motorized drive portion and a planetary gear reduction mechanism and/or a cycloid gear reduction). The cycloid gear reduction generally functions consistent with the embodiment of FIGS. 5-9. Features shown in the embodiment of FIGS. 5-9 may be employed in this embodiment, and vice versa. As shown, a second motor 24 is generally fixed in place (e.g., to a stanchion or base 32'). A first motor 22 may be translatable (e.g., relative to the second motor 24), such as in response to motion caused by the second motor 24. The apparatus may include a plurality (e.g., a pair) of common transverse shafts 34 and 36. The at least one common transverse shaft 34 may be adapted to be driven by at least the first motor 22. It may also be driven indirectly by the second motor 24, inasmuch as the second motor 24 may cause the first motor 22 to raise or lower along with the shaft 34. The apparatus may also include a transverse shaft 36 that is adapted to be driven by the second motor 24.

The motors each include a motor adapter (e.g., a plate) 162 for securing the motors within the assembly. For example, a motor may be attached to a motor adapter (such as by fasteners and/or integrally formed). The adapter in turn may be secured within a stanchion 32', a robot arm (e.g., a recess formed in an end of the robot arm), or otherwise. The first motor 22 is coupled with a first robot arm 14 that is adapted for translating the first robot arm 14 in a fore and aft, generally horizontal direction. The first robot arm 14 may be any shape, depending upon the application. The first robot arm 14 may be shaped similarly to the first robot arm depicted in FIG. 4a, which receives a shaft and translates the work-piece in a generally horizontal direction, such as for achieving a pitch during work-piece operations. One or more of the motors (e.g., the second motor 24 of FIGS. 10A and 10B) may be supported by a stanchion 32' or other base or support member. In this illustrative example, the second motor 24 includes an elongated drive shaft attachment portion 190 located on the drive shaft of the motor 24 that engages with the gear reduction mechanism (e.g., operatively engaged with the eccentric assembly 56 and/or a planetary gear assembly). Within the assembly is an end cap 164 with an opening that encircles the elongated drive shaft attachment portion 190. A spacer 168 is located within a bearing 166 and provides a space between the end cap 164 and the eccentric assembly 56. The eccentric assembly 56 may serve as an axle for the gear reduction mechanism and may include one or more out of phase eccentrics 56'. A bearing retainer 170 is generally located at the opposing end of the eccentric assembly. One or more cycloid gears 60 may also be located within the assembly and may include one or more openings or areas for receiving one or more collector pins 84.

The assembly includes a second robot arm 26 that functions to allow for raising and lowering of the at least one work-piece. A planetary gear reduction may assist in the raising and lowering using the second robot arm 26, the first robot arm 14, or both. The planetary gear reduction assembly may include a spacer 168 to provide space between a portion of the second robot arm 26 and other elements of the assembly. The planetary gear reduction assembly includes a bearing 166. The planetary gear assembly includes a planet carrier 172 that mounts to the eccentric assembly 56 and operatively receives elements of the planetary gear assembly. The planetary gear assembly includes a plurality of planet gears 174 that engage with and rotate around a centrally located sun gear 176. The plurality of planet gears and/or the sun gear include an axle 182 and a bearing 184 disposed therein. The planet gears are adapted for rotation by way of the respective axles 182 received within the gears and the planet carrier 172. The gears are circumscribed by a ring gear 178. The opposing face of the planetary gear assembly is adapted to be carried on a torque plate 180.

Figure 11A:
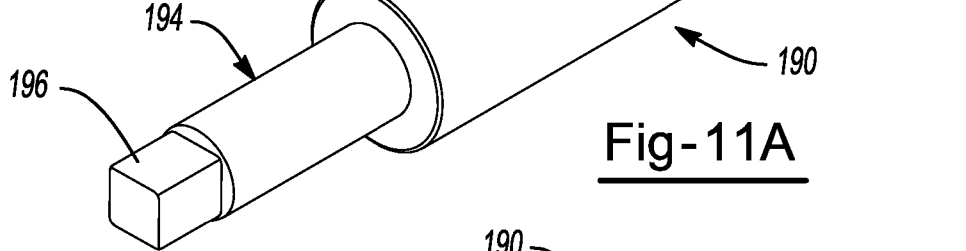
FIG. 11A is a perspective view of a drive shaft attachment portion.
Figure 11B:
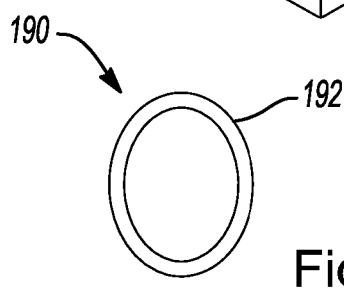
FIGS. 11B and 11C are cross sections of a portion of the drive shaft attachment portion taken along line B,C.
Figure 11C:
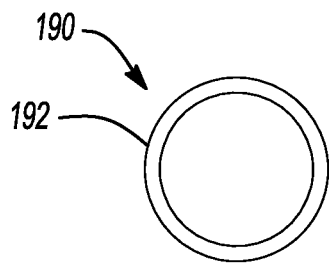

The elongated drive shaft attachment portion 190 that engages with the gear reduction mechanism (e.g., cycloid gear reduction, planetary gear reduction, or both) is shown in greater detail in FIG. 11A. The elongated drive shaft attachment portion 190 includes a first motor connection portion 192 which is located over the drive shaft of a motor, such as the second motor 24 of FIGS. 10A and 10B. The elongated drive shaft attachment portion 190 joins the first motor connection portion 192 and a gear box interface portion 194, which includes an engagement portion 196 that interfaces with the gear reduction mechanism (e.g., by a male/female connection). The engagement portion 196 may have one or more flat side surfaces. They are generally rectangular in cross-section profile in this illustrative example. The first motor connection portion 192 is generally hollow along a portion of its length. It may be oblong on an inside wall in its transverse cross-section, as is shown in FIG. 11B, which is the cross section of the elongated drive shaft attachment portion 190 of FIG. 11A taken at line B,C. When pressure is applied, the first motor connection portion 192 can be placed over the motor drive shaft, which may be generally cylindrical, as is shown in FIG. 11C, which is the cross section of the elongated drive shaft attachment portion 190 of FIG. 11A taken at line B,C, when pressure is applied. When the pressure is released, the elasticity of the material may cause the inner wall to generally return to its original shape, as shown in FIG. 11B, which engages with the motor drive shaft (e.g., in a press-fit and/or frictional manner).

As can be appreciated from the above, and taking into account the example illustrated in FIGS. 10A and 10B, when the motor 24 rotates its drive shaft about a drive shaft rotational axis, the drive shaft causes the sun gear 176 and/or the planet gears 174 to rotate about a rotation axis, which, for example, may be aligned with or parallel to the drive shaft rotational axis and causes the cycloid gears 60 to rotate about a rotational axis (by way of the eccentrics). Gear reduction is thus possible. As also seen, components of the gear reduction mechanism may be integrated as part of a robot arm.

It is contemplated that the first motor 22 acts through its own gear reduction mechanism to drive the first arm 14 or directly drive the work-piece engagement structure (see FIG. 1). Any motor of the assembly of any of the figures herein may be controlled to raise or lower an arm. Any motor may be controlled to achieve fore and aft motion (e.g., in a generally horizontal direction) of an arm. This movement can be performed by the same motor or different motors. This movement can be controlled by a controller (not shown) to achieve a desired translation path.

Other variations of the teachings herein are also possible. As illustrated, but without limitation, a pair of transverse shafts may be located at the upstream and downstream portions (e.g., end portions) of the apparatus. There may be a pair of transverse shafts, each located at opposing upstream and downstream portions of the apparatus. The shafts may have a cross-sectional shape that differs along the length of the shaft. For example, one or more of the shafts may be generally rectangular in a region for fixedly engaging a robot arm at one end portion. One or more of the shafts may be generally circular for pivotally engaging the same robot arm at another end portion. The shafts may be such that the shape extends at least a portion of the length so that the robot arms may be slidably adjustable along that portion of the length. The shafts may be configured for allowing translation of one or more arms (e.g., robot arms) at least partially along their length.

It will be appreciated from the present teachings that the apparatus may employ only a single motor (e.g., the first motor 22) for performing the function of translation in the fore and aft direction. A plurality of motors may be employed as well (e.g., two, three, four or more motors). A single motor or a plurality of motors may be employed being adapted for performing the function of translation (e.g., by way of a robot arm or other structure adapted for translation) of a work piece engagement structure in the fore and/or aft direction. A single motor or a plurality of motors may be employed which may be adapted for performing the function of raising or lowering (e.g., by way of a robot arm or other structure adapted for translation) a work piece engagement structure. A single motor or a plurality of motors can be employed, each being adapted for performing the function of raising or lowering, and causing motion in a fore and/or aft direction (e.g., by way of a robot arm or other structure adapted for translation) a work piece engagement structure); that is a single motor may be adapted for both lifting/lowering and pitch translation motions. One or more (or all) of the motors may be located on the same side of the apparatus. The transverse shafts and/or the robot arms, or other structure adapted for translation of a work piece engagement structure, may be driven by the motors from a single side of the apparatus, or from both sides of the apparatus.

Control over robot arm translation is versatile in accordance with present teachings. For example, one or more of the motors herein can be controlled (e.g., programmably controlled) for causing lifting of a robot arm from a starting position, forward translation of the arm, and then a return of the robot arm to the starting position, thereby completing a cycle. Lifting may include a portion of which is performed to include a generally arcuate motion, a linear motion, or both. The arcuate motion may include a plurality of minute horizontal and vertical movement the magnitude of which are such as to give the appearance of arcuate motion (e.g., a radial motion). The arcuate motion may include a single or a plurality of radial movements. The steps of performing the above motions is part of the teachings herein as well. Cycle rates may range from about 5 cycles per minute to about 120 cycles per minute (e.g., about 10 cycles per minute to about 90 cycles per minute, or even about 15 cycles per minute to about 60 cycles per minute). A cycle may include an advancing portion in which the one or more robot arms cause advancing of a work-piece from a first location to a second location from a robot arm initial position, and a returning portion in which the one or more robot arm returns to its initial position. The amount of time that it takes for the advancing portion of the cycle may be the same as, longer than or shorter than the amount of time for the returning portion. For example, the ratio of the amount of time for the advancing portion to the amount of time for the returning portion may range from about 6:1 to about 1:6, about 4:1 to about 1:4, or even about 2:1 to about 1:2.

Control over robot arm translation may also afford introducing one or more dwell times, during which a work-piece is maintained at a certain location within the system for a relatively prolonged time, such as for allowing desired operation to be performed on the work-piece, for performing an operation upon equipment used in one of the work-piece operations.

The instrument can be controlled for achieving translation amounts as desired for a particular work-piece. For example, translation amounts may range from about 1 mm to 1000 mm (or higher) (e.g., about 5 to about 500 mm, or about 15 mm to about 250 mm, or even about 25 to about 100 mm).

The controlling operations may be performed by one or more controllers (e.g., programmable logic controllers) associated with one or more of the respective motors. Therefore, a program can string together commands (e.g., using G-code) to get the desired motion for the desired application.

In operation, the at least one first motor will translate fore and aft, and the at least one second motor will translate upwardly and downwardly in order to cause the work piece engagement structures to contact the work piece and translate the work-piece from a first upstream position to a second downstream position. For example, the second motor may raise and lower to come into and out of engagement with a work-piece. While in a raised and engaged position, the second motor will cause a forward movement of the work-piece engagement structure. After the work-piece has been advanced downstream, the first motor will lower the work-piece engagement structure and the second motor will translate the work-piece engagement structure upstream where it can engage another subsequent work-piece. The steps can be repeated consecutively.

As depicted in the drawings, translating in the fore position may entail controlling the apparatus for advancing a work-piece longitudinally along the apparatus from right to left. However, the apparatus may be controlled for advancing a work-piece longitudinally along the apparatus from left to right. The apparatus may include one or more sensors adapted for ascertaining the position of one or more work-pieces. The apparatus may include one or more sensors for ascertaining the presence or absence of one or more work-pieces intended to be carried by the work-piece engagement structures. Any sensors employed may be in signaling communication with a suitable controller that controls operation of the apparatus. For example, if a certain condition is detected by a sensor, it may issue a signal (e.g., to the controller), which causes the controller to alter operation of the apparatus in a predetermined manner.

Other variations or features are possible in accordance with the teachings. The motors may be located below or above the work-piece engagement structures. The motors may be located adjoining a base or support of the apparatus. One or more of the motors may be mounted to a work-piece shaping system, such as a press (e.g., to a crown and/or a bolster of a press). Multiple motors may be employed with each having an output shaft having an axis of rotation. Where there are multiple motors, the respective axes of two or more of the axes may be generally parallel. They may be spaced apart. One of the axes may be positioned higher than the other one. The robot arm can have one, two, three or more pivotal joints. There may be one or more motors at each joint and/or for causing motion of at least a portion of the robot arm at such joints. It is also possible that the elongated work-piece engagement structure will be transversely oriented, and/or that there will be at least one transversely oriented elongated work-piece engagement structure and at least on longitudinally oriented elongated work-piece engagement structure.

The teachings herein also contemplate the subassemblies that are described. For example, it is within the scope of teachings herein that there will be a robot arm (as taught) and/or a motor in combination with one or more gear reduction mechanisms (as taught, e.g., a cycloid gear reduction mechanism, a planetary gear reduction mechanism as described). It is contemplated that an eccentric assembly, planet gear assembly, or both, may be employed for driving the first robot arm, the second robot arm, or both (e.g., an eccentric assembly may be located in either or both of the openings of the second robot arm and/or associated with either or both of the first and second motor). Mounting hardware may be used (e.g., a mounting foot or other like component for securing a robot arm, motor, and/or gear reduction mechanism to a support structure (e.g., an existing support structure, such as a crown and/or bolster of a press)). Kits comprising any of these components and/or subassemblies are also within the teachings herein.

Turning to FIGS. 12a through 12e, there is seen an example of how an apparatus 110 of the teachings herein is employed sequentially to advance a work-piece 100 longitudinally along the length of the apparatus, in this instance from the right side toward the left side. The apparatus 110 employs the general teachings herein (e.g., those described above and in connection with the embodiments of FIGS. 1-11c), essentially adapted to transfer a work-piece in a direction generally along at least a portion of the length of the apparatus 110. Elongated (and generally parallel) work-piece structures 112 (shown as generally rectangular slats) have a plurality of throughholes formed in them to receive pins or other hardware for pivotally connecting arms 114 to the structures 112. The elongated work-piece support structures 112 are positioned between a pair of generally parallel work-piece support members 150. The support members 150 are positioned above the support structure 132 by uprights 152. The support structure 132 is shown (by way of example only and without limitation) to include a plurality of optional inverted T-shaped slots 154 into which various hardware components are or can be positioned. The support members as shown in these figures may simulate or be part of a work station for producing a finished work-piece.

Figure 12A:
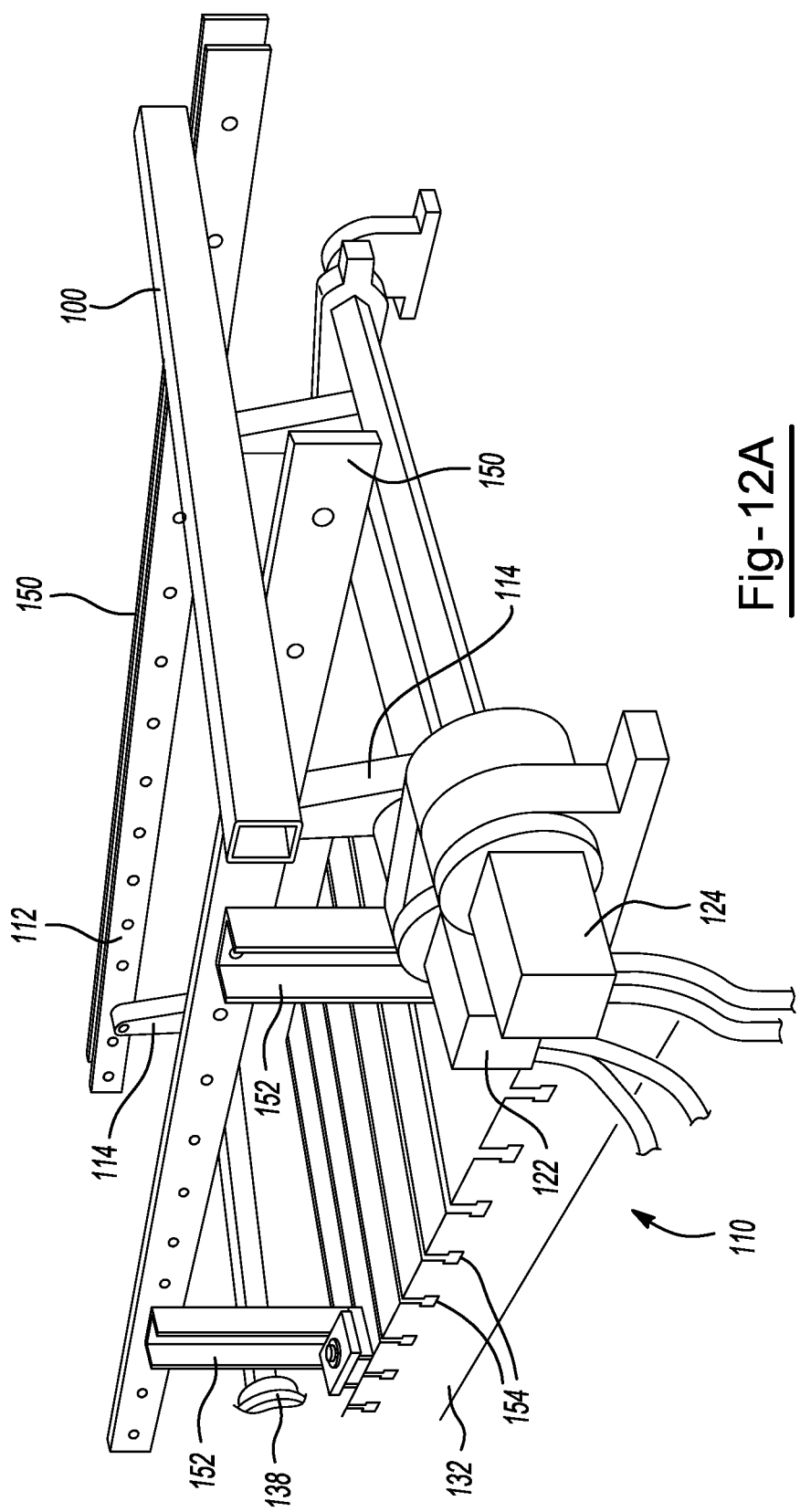
FIGS. 12A, 12B, 12C, 12D, and 12E are perspective views of an apparatus of the present teachings shown in various stages of advancing a work-piece along the length of the apparatus.
Figure 12B:
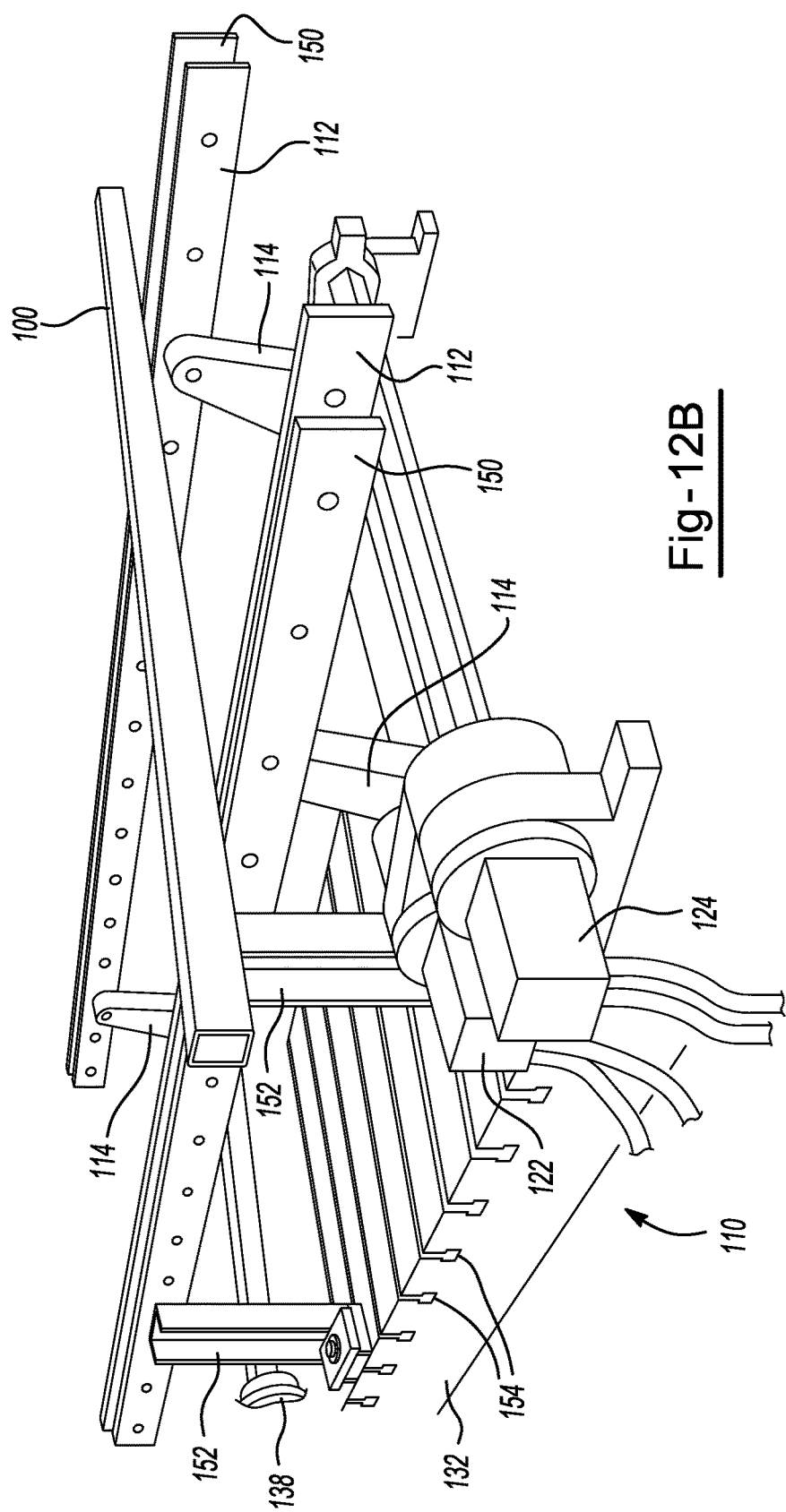
Figure 12C:
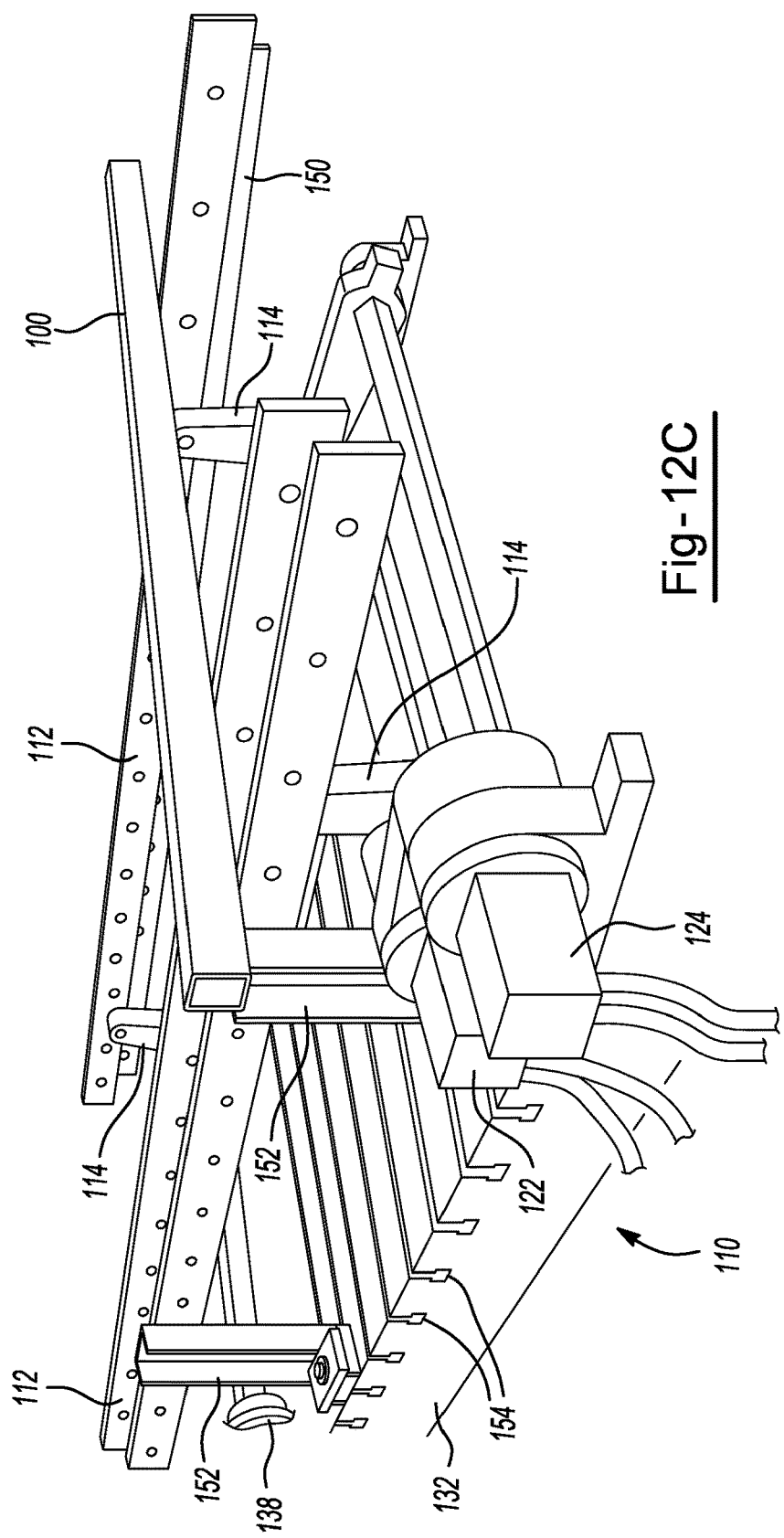
Figure 12D:
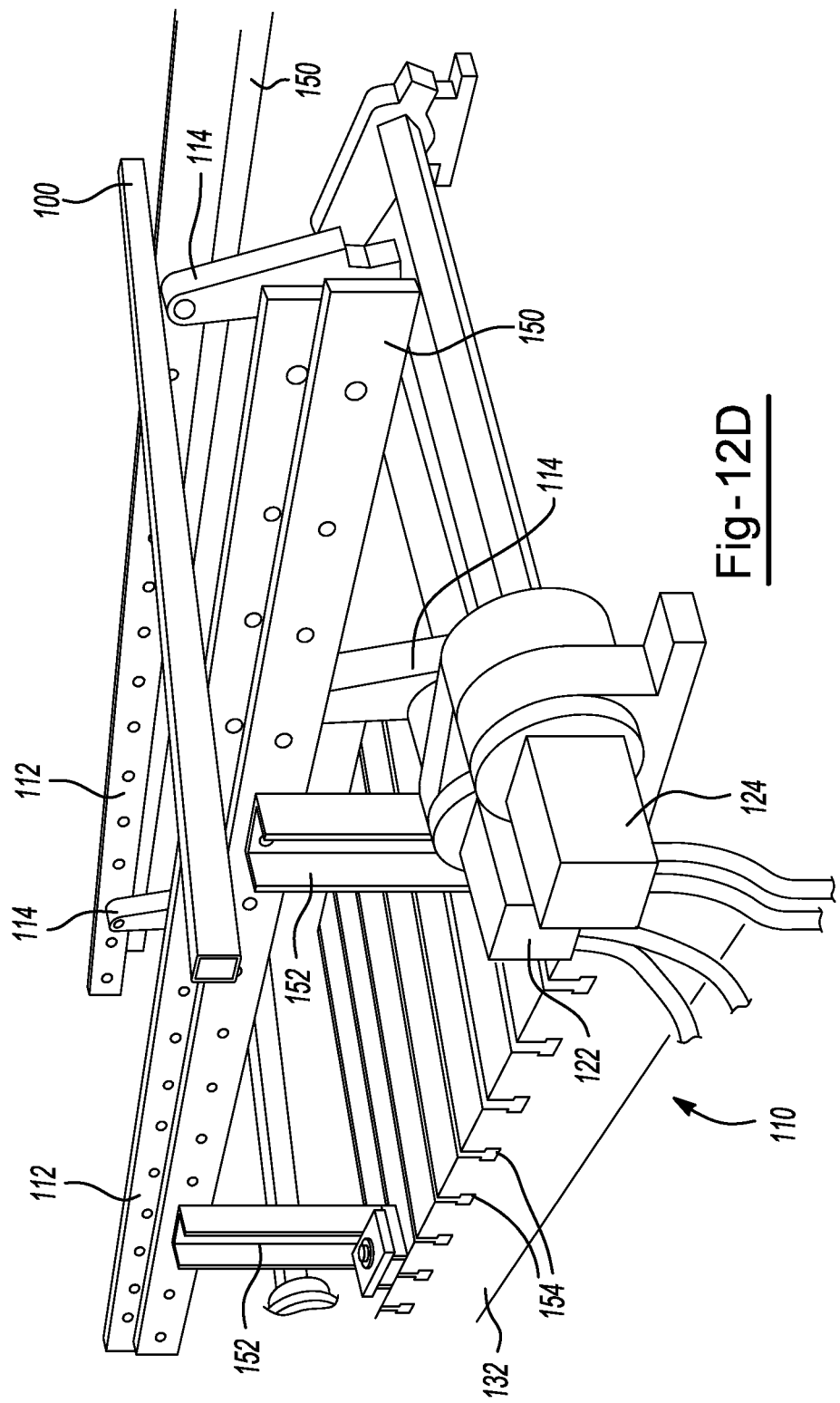
Figure 12E:
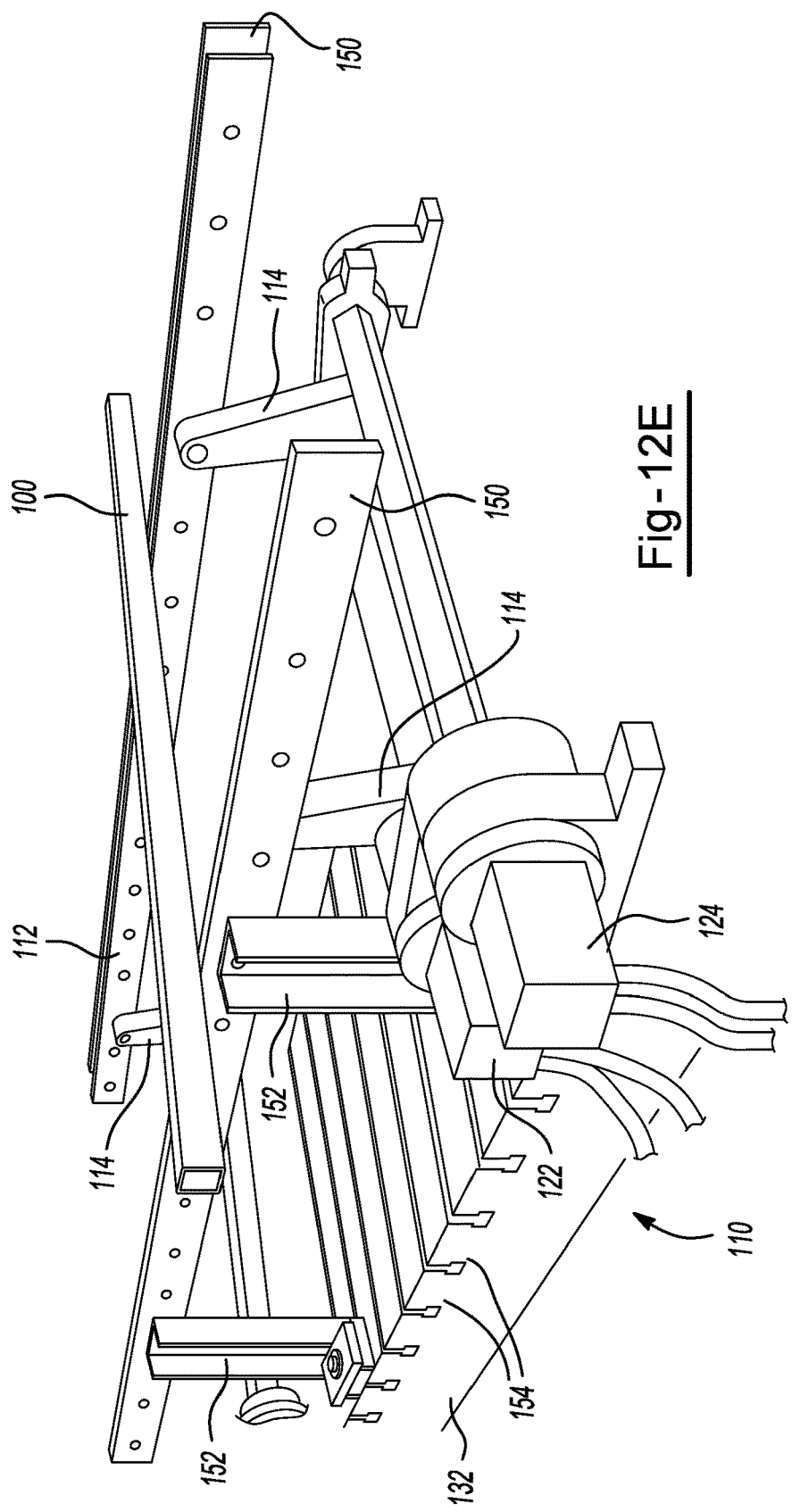

In FIG. 12a, the work-piece is in a first position as it rests on the support members 150. In FIG. 12b, the motors cause the robot arms (via a gear reduction mechanism (e.g., a cycloid gearing assembly such as described herein) to cause the work-piece engagement structures 112 to translate upstream at a height so that the top surface of the work-piece engagement structures 112 is below the top surface of the work-piece support members 150. It is then caused to raise (FIG. 12c) by one or both of the motors 122 and 124 and the robot arms that they respectively drive, so that the work-piece is above the top surface of the support members 150. Another downstream motor 138 may facilitate similar downstream motion of the elongated work-piece engagement structures 112, by way one or more of its own associated arms 114 and any associated gear reduction mechanism. As part of that step, or by its own step, one or more of the motors may cause the work-piece engagement structures 112 to pitch forward, and thus advance the work-piece 100 at least partially downstream along the length of the apparatus (see FIG. 12d). For example, the motor 122 may be adapted to cause the fore and aft robot arm motion for effectuating the pitch. The motors 124 and/or 138 may be employed for raising and/or lowering the work-piece engagement structures 112.

Figure 13:
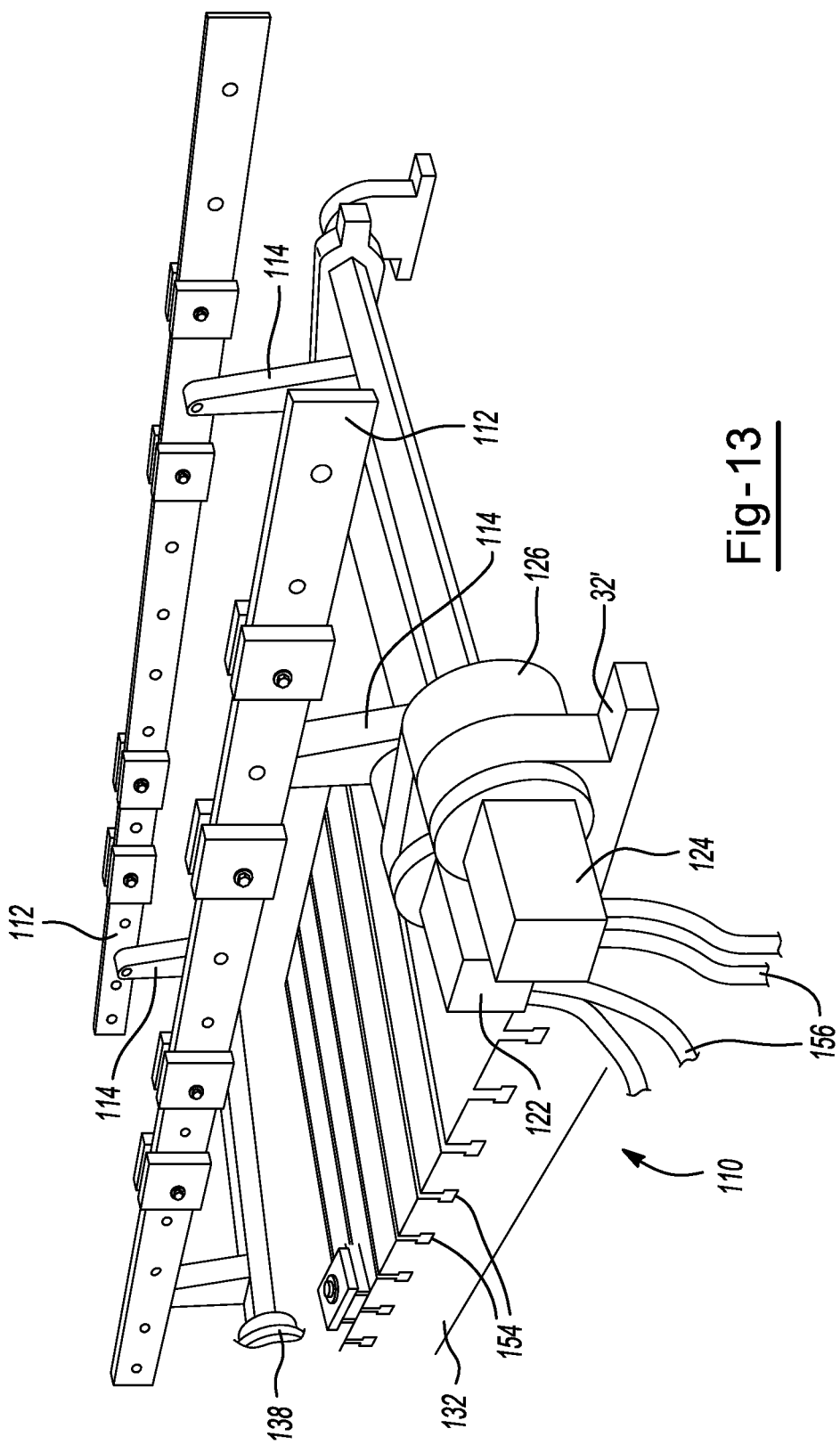
FIG. 13 is a perspective view of an apparatus of the present teachings.

Turning to FIG. 13, there is seen an example of an apparatus 110 employing generally the teachings herein (e.g., those described above and in connection with the embodiments of FIGS. 1-12e), essentially adapted to transfer a work-piece in a direction generally along at least a portion of the length of the apparatus 110. Elongated (and generally parallel) work-piece structures 112 (shown as generally rectangular slats) have a plurality of throughholes formed in them to receive pins or other hardware for pivotally connecting arms 114 to the structures 112. The work-piece structures 112 may also include one or more fingers or other attachments for assisting in holding and/or transferring a work-piece. The support structure 132 is shown (by way of example only and without limitation) to include a plurality of optional inverted T-shaped slots 154 into which various hardware components are or can be positioned. One or both of the motors 122 and 124 may cause a first robot arm 114 to move upward, downward, in a fore direction, in an aft direction, or any combination thereof. One or both of the motors 122 and 124 may also cause a second robot arm 126 to move upward, downward, in a fore direction, in an aft direction, or any combination thereof. A downstream motor 138 may also cause a robot arm to move upward, downward, in a fore direction, in an aft direction, or any combination thereof. In this example, the second motor 124 is fixed to the support structure 132 by a stanchion 32'. The motors, stanchion, and the arms are assembled so that one or more gear reduction mechanisms are at least partially housed within the second robot arm 126, first robot arm 114, or both. One or more power cords 156 or other cords may connect the motors to a control panel, power source, controller, or the like.

In this regard, as part of the general teachings herein, applicable to the various embodiments contemplated, it may be possible for one motor to be mounted to and carried on a structure translatable by another motor (e.g., a motor such as motor 122 may be mounted to a robot arm that is translated by another motor, such as motor 124). Thus, raising and lowering may be performed by one motor, and pitch may be performed by another motor.

Figure 14:
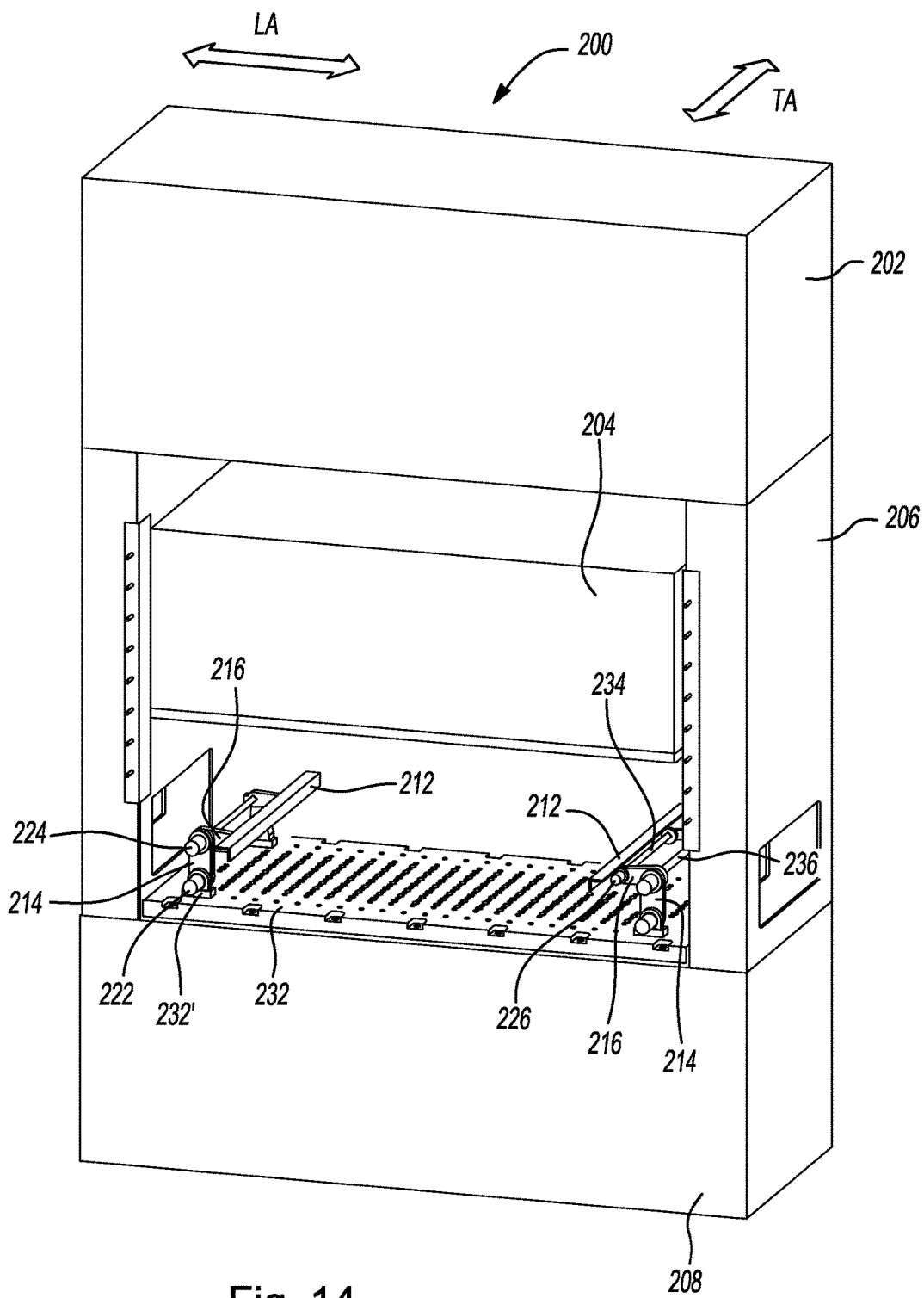
FIG. 14 is a perspective view of an apparatus of the present teachings mounted to a bolster plate of a press.
Figure 15:
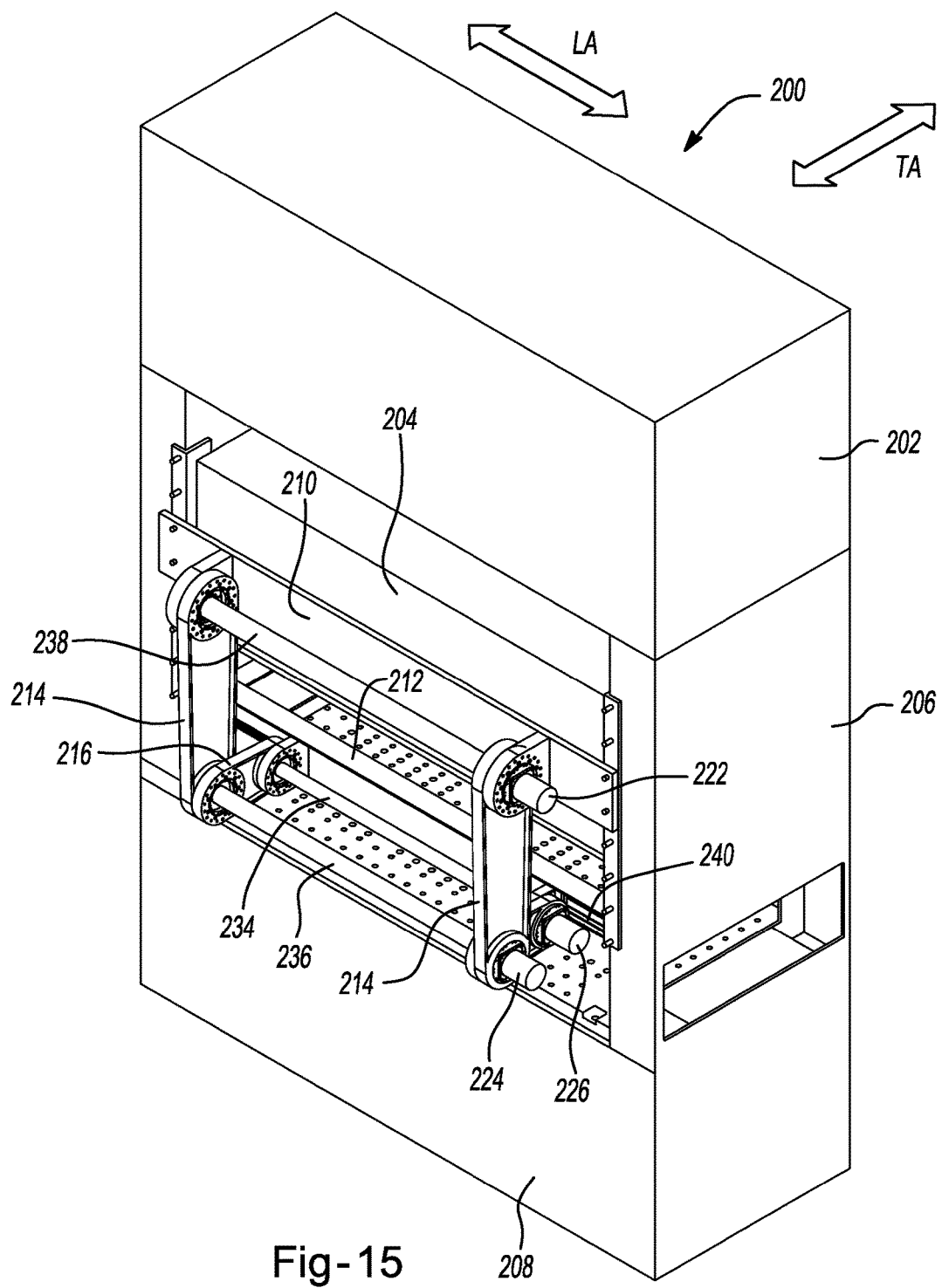
FIG. 15 is a perspective view of an apparatus of the present teachings mounted to upright support members of a press.

FIGS. 14 and 15 illustrate the apparatus as discussed herein installed on a press 200. The press includes a longitudinal axis LA and a transverse axis TA. The press 200 may include a crown portion 202, which is an upper portion of the press 200 containing the drive mechanisms or cylinders that guide the reciprocating motion of a ram 204 (i.e., the main upper portion of the press that slides up and down within the press). The press 200 includes opposing upright support members 206 that extend upward from a bed portion 208, which is the foundation and supporting structure of the press. FIG. 14 shows the apparatus mounted to a bolster plate 232 of the press 200 via a mounting structure such as a stanchion 232'. FIG. 15 illustrates the apparatus mounted to the press 200 by a cross member 210 extending between the opposing upright support members 206. The apparatus includes two opposing work-piece engagement structures 212 for engaging and moving a work-piece through the press. A work-piece can enter the press along the longitudinal axis LA of the press, the transverse axis TA of the press, or at an angle in between. The orientation of the apparatus will guide the work-piece in the desired direction.

The work-piece engagement structure 212 is coupled to a first robot arm 216. A first motor 226 is located generally at the joint between the work-piece engagement structure 212 and the first arm 216. The first motor 226 acts as a wrist motor and allows the work-piece engagement structure 212 (and/or the work-piece, not shown) to maintain a desired orientation, even if other elements of the apparatus are moving. The first motor 226 may allow the work-piece engagement structure 212 to raise and lower. Linear motion or translation of the work-piece engagement structure 212 is accomplished by a linear actuation motor 240. The linear translation may be in a direction generally perpendicular to the first robot arm 216 (see FIG. 15), generally parallel to the axis of rotation of one of the joints of the apparatus, or both, so that the work-piece can be advanced in that direction. This linear actuation can be accomplished by a motor actuating linear motion directly or by a mechanism that converts rotary motion (e.g., from a rotary motor) to linear motion. Examples for actuating linear motion include linear servo motor drive, lead screw drive, or belt drive. A second robot arm 214 is coupled to the opposing side of the first robot arm 216. A second motor 224 is located generally at the joint between the first robot arm 216 and the second robot arm 214. The second motor 224 may enable the first robot arm 216 to raise and lower. The second robot arm 214 is coupled to the base (i.e., the stanchion 232' of FIG. 14 or the cross member 210 of FIG. 15). A third motor 222 is located generally at the joint between the base and the second robot arm 214. The third motor 222 may enable the second robot arm 214 to translate in a fore and aft direction, raise and lower, or both. Each apparatus includes a parallel opposing robot arm joined to the first robot arm 216 and second robot arm 214 carrying the motors. FIG. 14 also shows two opposing apparatuses located on opposing ends of the press 200. The parallel opposing robot arms (e.g., a first robot arm 216 and opposing first robot arm; second robot arm 214 and opposing second robot arm) are joined by connecting shafts 234, 236, and 238. These connecting shafts provide support to the apparatus and work-piece and additional strength for transferring and moving a work-piece.

After the work-piece has been advanced, another cycle is started. The elongated engagement structures are caused to lower away from the work-piece and move upstream where it will start the series of motions over again.

The system herein may be operated by one or more switches and/or signaling sources or circuits for supplying the motors with a source of power.

Units depicted in the drawings are illustrative and not intended as limiting. They may vary as necessary for achieving the appropriate translation. Relative proportions depicted in the drawings are part of the teachings even if not expressly recited herein.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of, or even consisting of, the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

Relative positional relationships of elements depicted in the drawings are part of the teachings herein, even if not verbally described. Further, geometries shown in the drawings (though not intended to be limiting) are also within the scope of the teachings, even if not verbally described.

What is claimed is:

1. A work-piece transfer apparatus comprising:
   a. at least one generally elongated work-piece engagement structure;
   b. at least one first robot arm having a first end portion and a second end portion, the first end portion being pivotally connected to the at least one generally elongated work-piece engagement structure;
   c. a first motor coupled to the at least one first robot arm at the second end portion and being adapted for translating the at least one first robot arm fore and aft in a generally horizontal direction;
   d. a second motor;
   e. at least one second robot arm having a first end portion and a second end portion, the first end portion of the at least one second robot arm being in operating driving relationship with the second motor, and the second end portion operatively coupled with the at least one generally elongated work-piece engagement structure for raising and lowering the at least one generally elongated work-piece engagement structure; and
   f. a support structure for supporting, from below, the first and second motor, the at least one first robot arm, the at least one second robot arm, and the at least one generally elongated work-piece engagement structure; wherein the first and second motors are operated synchronously to raise and lower the at least one generally elongated work-piece engagement structure, and translate the at least one generally elongated work-piece engagement structure in a fore and aft direction by way of one or both of the at least one first and second robot arms.

2. The apparatus of claim 1, wherein the apparatus includes at least two generally parallel and spaced apart generally elongated work-piece engagement structures.

3. The apparatus of claim 1, wherein the apparatus includes at least two generally parallel and spaced apart generally elongated work-piece engagement structures that are supported by at least one common transverse shaft.

4. The apparatus of claim 1, wherein the apparatus includes at least two generally parallel and spaced apart generally elongated work-piece engagement structures that are supported by at least one common transverse shaft that is adapted to be driven by the second motor.

5. The apparatus of claim 1, wherein the apparatus includes a transverse shaft that is adapted to be driven by the first motor.

6. The apparatus of claim 1, wherein the apparatus includes one or more generally elongated work-piece engagement structures that each are adapted for pivot connection to the at least one first robot arm by way of a downward projection located toward an end of the one or more generally elongated work-piece engagement structures.

7. The apparatus of claim 1, wherein the one or more generally elongated work-piece engagement structures carry a plurality of transversely extending fingers.

8. The apparatus of claim 1, wherein one or both of the first and second motors are servo motors.

9. The apparatus of claim 1, wherein the apparatus includes at least two generally parallel and spaced apart generally elongated work-piece engagement structures that are supported by a pair of spaced apart transverse shafts, wherein one transverse shaft is driven by at least the first motor and another transverse shaft is adapted to be driven by the second motor.

10. The apparatus of claim 1, wherein the apparatus includes at least two generally parallel and spaced apart generally elongated work-piece engagement structures that are not joined together.

11. The apparatus of claim 1, wherein a cycloid gear assembly is housed within one or more of the robot arms.

12. The apparatus of claim 1, wherein one of the first or second motor is mounted in a fixed position, and the other of the first or second motor is mounted for translation to a structure that is driven by the motor mounted in a fixed position.

13. The apparatus of claim 1, wherein the apparatus includes a motor for enabling linear motion of the at least one generally elongated work-piece engagement structure in a direction parallel to a longitudinal axis of the at least one generally elongated work-piece engagement structure.

14. A work-piece transfer apparatus comprising:
   a. at least one generally elongated work-piece engagement structure;
   b. a linear actuation motor coupled with the at least one generally elongated work-piece engagement structure;
   c. at least one first robot arm having a first end portion and a second end portion, the first end portion being connected to the at least one generally elongated work-piece engagement structure,
   d. a first motor coupled to the at least one first robot arm and at least one generally elongated work-piece engagement structure;
   e. at least one second robot arm coupled with the second end portion of the at least one first robot arm;
   f. a second motor coupled to the at least one first robot arm and the at least one second robot arm;
   g. a base for supporting the at least one first robot arm, the at least one second robot arm, and the at least one generally elongated work-piece engagement structure and mounting the apparatus to a structure; and
   h. a third motor coupled to the base and the at least one second robot arm;
   wherein the linear actuation motor is operated to provide linear movement in a longitudinal or transverse direction in relation to the structure;
   wherein the first motor is operated to maintain a desired orientation of the least one generally elongated work-piece engagement structure; and
   wherein the second and third motors are operated synchronously to raise and lower the at least one generally elongated work-piece engagement structure, and translate the at least one generally elongated work-piece engagement structure in a fore and aft direction by way of one or both of the at least one first and second robot arms.

15. The apparatus of claim 14, wherein the base is a stanchion for mounting the apparatus to the structure.

16. The apparatus of claim 14, wherein the base is a cross member for mounting the apparatus to an upright support member of the structure.

17. The apparatus of claim 15, wherein the structure is a press.

18. The apparatus of claim 17, wherein the press includes two or more of the apparatus arranged on opposite sides of the press.

19. The apparatus of claim 14, wherein a cycloid gear assembly is housed within one or more of the robot arms.

20. The apparatus of claim 14, wherein one or more of the first motor, second motor and third motor is a servo motor.

* * * * *

UNITED STATES PATENT AND TRADEMARK OFFICE
CERTIFICATE OF CORRECTION

PATENT NO. : 10,233,033 B2  
APPLICATION NO. : 14/554562  
DATED : March 19, 2019  
INVENTOR(S) : Timothy R. Launiere Page 1 of 1

It is certified that error appears in the above-identified patent and that said Letters Patent is hereby corrected as shown below:

On the Title Page

Title and in the Specification, Column 1, Lines 1-2:
Remove "MULTIPLE AXIS WORK-PIECE TRANFSER APPARATUS"
Replace with --MULTIPLE AXIS WORK-PIECE TRANSFER APPARATUS--

Signed and Sealed this
Thirty-first Day of March, 2020

Andrei Iancu
*Director of the United States Patent and Trademark Office*